US009467692B2

(12) United States Patent
Rapaka et al.

(10) Patent No.: US 9,467,692 B2
(45) Date of Patent: Oct. 11, 2016

(54) INTRA PREDICTION IMPROVEMENTS FOR SCALABLE VIDEO CODING

(71) Applicant: QUALCOMM Incorporated, San Diego, CA (US)

(72) Inventors: Krishnakanth Rapaka, San Diego, CA (US); Jianle Chen, San Diego, CA (US); Marta Karczewicz, San Diego, CA (US); Vadim Seregin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 421 days.

(21) Appl. No.: 14/011,441

(22) Filed: Aug. 27, 2013

(65) Prior Publication Data

US 2014/0064360 A1    Mar. 6, 2014

Related U.S. Application Data

(60) Provisional application No. 61/696,107, filed on Aug. 31, 2012, provisional application No. 61/707,487, filed on Sep. 28, 2012, provisional application No. 61/707,660, filed on Sep. 28, 2012, provisional application No. 61/735,519, filed on Dec. 10, 2012.

(51) Int. Cl.
H04N 19/00       (2014.01)
H04N 19/187      (2014.01)
(Continued)

(52) U.S. Cl.
CPC ...... H04N 19/00424 (2013.01); H04N 19/103 (2014.11); H04N 19/105 (2014.11);
(Continued)

(58) Field of Classification Search
None
See application file for complete search history.

(56) References Cited

U.S. PATENT DOCUMENTS 7,733,963 B2    6/2010  Park et al.
8,315,308 B2   11/2012  Bao et al.
(Continued)

FOREIGN PATENT DOCUMENTS

WO    WO-03036980 A1     5/2003
WO    WO-2008004940 A1   1/2008
WO    WO-2012095350 A1   7/2012

OTHER PUBLICATIONS

Ugur, Kemal, et al. High Performance, Low Complexity Video Coding and the Emerging HEVC Standard, IEEE Transactions on Circuits and Systems for Video Technology, vol. 20, No. 12 (Dec. 2010).*

(Continued)

Primary Examiner — William C Vaughn, Jr.
Assistant Examiner — Lindsay Uhl
(74) Attorney, Agent, or Firm — Knobbe, Martens, Olson & Bear, LLP

(57) ABSTRACT

An apparatus for coding video information according to certain aspects includes a memory unit and a processor in communication with the memory unit. The memory unit stores video information associated with a reference layer and a corresponding enhancement layer. The processor determines a value of a video unit positioned at a position within the enhancement layer based at least in part on an intra prediction value weighted by a first weighting factor, wherein the intra prediction value is determined based on at least one additional video unit in the enhancement layer, and a value of a co-located video unit in the reference layer weighted by a second weighting factor, wherein the co-located video unit is located at a position in the reference layer corresponding to the position of the video unit in the enhancement layer. In some embodiments, the at least one of the first and second weighting factors is between 0 and 1.

41 Claims, 17 Drawing Sheets

(51) Int. Cl.
*H04N 19/593* (2014.01)
*H04N 19/30* (2014.01)
*H04N 19/105* (2014.01)
*H04N 19/176* (2014.01)
*H04N 19/46* (2014.01)
*H04N 19/129* (2014.01)
*H04N 19/11* (2014.01)
*H04N 19/103* (2014.01)
*H04N 19/117* (2014.01)
*H04N 19/136* (2014.01)
*H04N 19/18* (2014.01)
*H04N 19/33* (2014.01)
*H04N 19/59* (2014.01)

(52) U.S. Cl.
CPC ........... *H04N 19/11* (2014.11); *H04N 19/117* (2014.11); *H04N 19/129* (2014.11); *H04N 19/136* (2014.11); *H04N 19/176* (2014.11); *H04N 19/18* (2014.11); *H04N 19/187* (2014.11); *H04N 19/30* (2014.11); *H04N 19/33* (2014.11); *H04N 19/46* (2014.11); *H04N 19/59* (2014.11); *H04N 19/593* (2014.11)

(56) References Cited

U.S. PATENT DOCUMENTS

| | | |
|---|---|---|
| 2006/0153294 A1 | 7/2006 | Wang et al. |
| 2006/0215762 A1* | 9/2006 | Han ............... H04N 19/105 375/240.16 |
| 2007/0014348 A1 | 1/2007 | Bao et al. |
| 2007/0160133 A1* | 7/2007 | Bao ............... H04N 19/105 375/240.1 |
| 2007/0274388 A1 | 11/2007 | Lee et al. |
| 2008/0007438 A1* | 1/2008 | Segall ............... H04N 19/176 341/61 |
| 2008/0089417 A1* | 4/2008 | Bao ............... H04N 19/176 375/240.16 |
| 2008/0175498 A1* | 7/2008 | Lee ............... H04N 19/105 382/238 |
| 2009/0074060 A1* | 3/2009 | Kim ............... H04N 21/234327 375/240.12 |
| 2009/0220004 A1 | 9/2009 | Cieplinski et al. |
| 2011/0249741 A1* | 10/2011 | Zhao ............... H04N 19/197 375/240.15 |

OTHER PUBLICATIONS

Han, Woo-Jin, et al., Improved Video Compression Efficiency Through Flexible Unit Representation and Corresponding Extension of Coding Tools, IEE Transactions on Circuits and Systems for Video Technology, vol. 20, No. 12 (Dec. 2010).*
Bao Y., et al., "Improvements to Fine Granularity Scalability for Low-Delay Applications", 15. JVT Meeting; 72. MPEG Meeting; Apr. 16, 2005-Apr. 22, 2005; Busan, KR; (Joint Video Team of ISO/IEC JTC1/SC29/WG11 and ITU-T SG.16),, No. JVT-O054, Apr. 17, 2005, pp. 1-8, XP030005999, ISSN: 0000-0417.
International Search Report and Written Opinion—PCT/US2013/057139—ISA/EPO—Apr. 9, 2014.
Partial International Search Report—PCT/US2013/057139—ISA/EPO—Jan. 2, 2014.

* cited by examiner

| R | A | B | C | D | E | F | G | H |
|---|---|---|---|---|---|---|---|---|
| I | a | b | c | d |   |   |   |   |
| J | e | f | g | h |   |   |   |   |
| K | i | j | k | l |   |   |   |   |
| L | m | n | o | p |   |   |   |   |
| M |   |   |   |   |   |   |   |   |
| N |   |   |   |   |   |   |   |   |
| O |   |   |   |   |   |   |   |   |
| P |   |   |   |   |   |   |   |   |

…

INTRA PREDICTION IMPROVEMENTS FOR SCALABLE VIDEO CODING

RELATED APPLICATION

This application claims the benefit of U.S. Provisional Application No. 61/696,107, filed on Aug. 31, 2012, entitled "INTRA PREDICTION IMPROVEMENTS FOR SCALABLE VIDEO CODING," U.S. Provisional Application No. 61/707,487, filed on Sep. 28, 2012, entitled "INTRA PREDICTION IMPROVEMENTS FOR SCALABLE VIDEO CODING," U.S. Provisional Application No. 61/707,660, filed on Sep. 28, 2012, entitled "INTRA PREDICTION FOR ENHANCED LAYERS USING BASE AND ENHANCEMENT LAYER PREDICTION SAMPLES," and U.S. Provisional Application No. 61/735,519, filed on Dec. 10, 2012, entitled "METHOD AND APPARATUS FOR INTRA PREDICTION IMPROVEMENTS IN SCALABLE VIDEO CODING," which are incorporated herein by reference in their entireties.

TECHNICAL FIELD

This disclosure relates to video coding.

BACKGROUND

Digital video capabilities can be incorporated into a wide range of devices, including digital televisions, digital direct broadcast systems, wireless broadcast systems, personal digital assistants (PDAs), laptop or desktop computers, tablet computers, e-book readers, digital cameras, digital recording devices, digital media players, video gaming devices, video game consoles, cellular or satellite radio telephones, so-called "smart phones," video teleconferencing devices, video streaming devices, and the like. Digital video devices implement video coding techniques, such as those described in the standards defined by MPEG-2, MPEG-4, ITU-T H.263, ITU-T H.264/MPEG-4, Part 10, Advanced Video Coding (AVC), the High Efficiency Video Coding (HEVC) standard presently under development, and extensions of such standards. The video devices may transmit, receive, encode, decode, and/or store digital video information more efficiently by implementing such video coding techniques.

Video coding techniques include spatial (intra-picture) prediction and/or temporal (inter-picture) prediction to reduce or remove redundancy inherent in video sequences. For block-based video coding, a video slice (e.g., a video frame or a portion of a video frame) may be partitioned into video blocks, which may also be referred to as treeblocks, coding units (CUs) and/or coding nodes. Video blocks in an intra-coded (I) slice of a picture are encoded using spatial prediction with respect to reference samples in neighboring blocks in the same picture. Video blocks in an inter-coded (P or B) slice of a picture may use spatial prediction with respect to reference samples in neighboring blocks in the same picture or temporal prediction with respect to reference samples in other reference pictures. Pictures may be referred to as frames, and reference pictures may be referred to a reference frames.

Spatial or temporal prediction results in a predictive block for a block to be coded. Residual data represents pixel differences between the original block to be coded and the predictive block. An inter-coded block is encoded according to a motion vector that points to a block of reference samples forming the predictive block, and the residual data indicating the difference between the coded block and the predictive block. An intra-coded block is encoded according to an intra-coding mode and the residual data. For further compression, the residual data may be transformed from the pixel domain to a transform domain, resulting in residual transform coefficients, which then may be quantized. The quantized transform coefficients, initially arranged in a two-dimensional array, may be scanned in order to produce a one-dimensional vector of transform coefficients, and entropy coding may be applied to achieve even more compression.

SUMMARY

In general, in some aspects, this disclosure describes techniques related to predicting a video unit value using different techniques or modes, and applying a weighting factor to each mode calculation to determine the video unit value. In some embodiments, the weighting factors are predetermine and may be coded in a video bitstream. In some embodiments, the weighting factors are determined based upon the position of the video unit within an associated block. For example, the weighting factors may be selected from a predetermined list or group of weighting factors based upon the position of the video unit within the block. In another embodiment, the weighting factors are calculated by using video block position information. In one embodiment, the closer the video unit (e.g., pixel) is to the top and/or left edge of the block, the greater the weighting unit associated with an intra prediction mode. In another embodiment, the farther the video unit is from the top and left edge of the block, the greater the weighting unit associated with an intra BL prediction mode.

An apparatus for coding video information according to certain aspects includes a memory unit and a processor in communication with the memory unit. The memory unit stores video information associated with a reference layer and a corresponding enhancement layer. The processor determines a value of a video unit positioned at a position within the enhancement layer based at least in part on an intra prediction value weighted by a first weighting factor, wherein the intra prediction value is determined based on at least one additional video unit in the enhancement layer, and a value of a co-located video unit in the reference layer weighted by a second weighting factor, wherein the co-located video unit is located at a position in the reference layer corresponding to the position of the video unit in the enhancement layer. In some embodiments, the at least one of the first and second weighting factors is between 0 and 1.

An apparatus for coding video information according to certain aspects includes a memory unit and a processor in communication with the memory unit. The memory unit stores video information associated with a reference layer and a corresponding enhancement layer (EL). The processor determines a prediction value of a pixel in the EL based at least in part on an average value of a plurality of pixels in the reference layer.

An apparatus for coding video information according to certain aspects includes a memory unit and a processor in communication with the memory unit. The memory unit stores video information associated with an enhancement layer. The processor applies a smoothing filter to a video unit and at least one additional video unit adjacent to the video unit when the video unit is a pixel value.

An apparatus for coding video information according to certain aspects includes a memory unit and a processor in communication with the memory unit. The memory unit stores difference video information associated with a difference video layer of pixel information that is derived from a difference between an enhancement layer and a corresponding reference layer. A first spatial resolution is associated with the enhancement layer, and a second spatial resolution is associated with the reference layer. The processor determines a value of a video unit positioned at a position within the enhancement layer based at least in part on the difference video layer when the first spatial resolution is not equal to the second spatial resolution. The processor further refrains from determining the value of the video unit based at least in part on the difference video layer when the first spatial resolution is equal to the second spatial resolution.

The details of one or more examples are set forth in the accompanying drawings and the description below. Other features, objects, and advantages will be apparent from the description and drawings, and from the claims.

DETAILED DESCRIPTION

Figure 1:
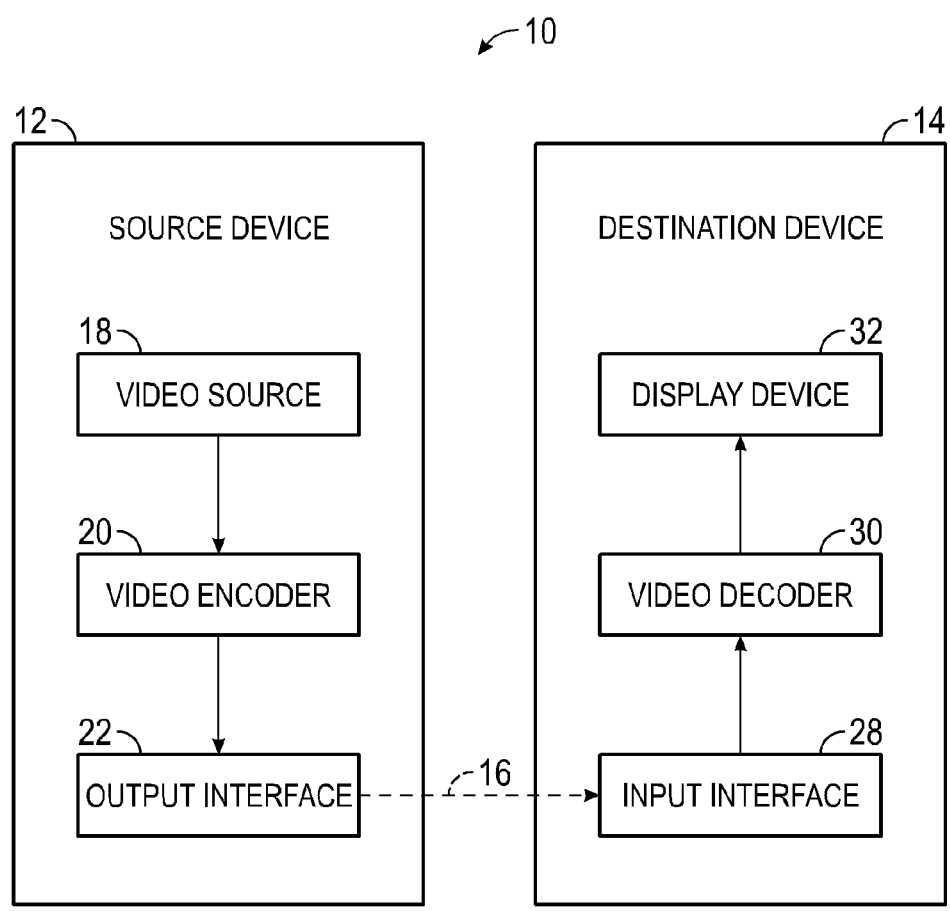
FIG. 1 is a block diagram illustrating an example video encoding and decoding system that may utilize techniques in accordance with aspects described in this disclosure.

The techniques described in this disclosure generally relate to scalable video coding (SVC) and 3D video coding. For example, the techniques may be related to, and used with or within, a High Efficiency Video Coding (HEVC) scalable video coding (SVC) extension. The HEVC SVC extension may also be referred to as Scalable HEVC (SHVC). In an SVC extension, there could be multiple layers of video information. The layer at the very bottom level may serve as a base layer (BL), and the layer at the very top may serve as an enhanced layer (EL). The "enhanced layer" is sometimes referred to as an "enhancement layer," and these terms may be used interchangeably. All layers in the middle may serve as either or both ELs or BLs. For example, a layer in the middle may be an EL for the layers below it, such as the base layer or any intervening enhancement layers, and at the same time serve as a BL for the enhancement layers above it.

For purposes of illustration only, the techniques described in the disclosure are described with examples including only two layers (e.g., lower level layer such as the base layer, and a higher level layer such as the enhanced layer). It should be understood that the examples described in this disclosure can be extended to examples with multiple base layers and enhancement layers as well.

Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. In addition, a new video coding standard, namely High Efficiency Video Coding (HEVC), is being developed by the Joint Collaboration Team on Video Coding (JCT-VC) of ITU-T Video Coding Experts Group (VCEG) and ISO/IEC Motion Picture Experts Group (MPEG). A recent draft of HEVC is available from http://wg11.sc29.org/jct/doc_end_user/current_document.php?id=5885/JCTVC-I1003-v2, as of Jun. 7, 2012. Another recent draft of the HEVC standard, referred to as "HEVC Working Draft 7" is downloadable from http://phenix.it-sudparis.eu/jct/doc_end_user/documents/9_Geneva/wg11/JCTVC-I1003-v3.zip, as of Jun. 7, 2012. The full citation for the HEVC Working Draft 7 is document JCTVC-I1003, Bross et al., "High Efficiency Video Coding (HEVC) Text Specification Draft 7," Joint Collaborative Team on Video Coding (JCT-VC) of ITU-T SG16 WP3 and ISO/IEC JTC1/SC29/WG11, 9$^{th}$ Meeting: Geneva, Switzerland, Apr. 27, 2012 to May 7, 2012. An additional recent draft of the HEVC standard, referred to as "HEVC Working Draft (WD) 8," is available from http://phenix.int-evry.fr/jct/doc_en-d_user/documents/10_Stockholm/wg11/JCTVC-JI003-v8.zip. Another recent working version of the HEVC standard is JCTVT-N0041. The approved HECV specification can be found at http://www.itu.int/rec/T-REC-H.265-201304-I. Each of these references is incorporated by reference in its entirety.

Scalable video coding (SVC) may be used to provide quality (also referred to as signal-to-noise (SNR)) scalability, spatial scalability and/or temporal scalability. An enhanced layer may have different spatial resolution than base layer. For example, the spatial aspect ratio between EL and BL can be 1.0, 1.5, 2.0 or other different ratios. In other words, the spatial aspect of the EL may equal 1.0, 1.5, or 2.0 times the spatial aspect of the BL. In some examples, the scaling factor of the EL may be greater than the BL. For example, a size of pictures in the EL may be greater than a size of pictures in the BL. In this way, it may be possible, although not a limitation, that the spatial resolution of the EL is larger than the spatial resolution of the BL.

In coding an enhancement layer, intra prediction may be performed using either pixel domain or difference domain. Intra prediction is based on neighboring pixels and the intra prediction mode. Some examples of intra prediction modes include vertical mode, horizontal mode, DC mode, planar mode, angular mode. Additional intra prediction modes may also be available. For example, in HEVC, 18 intra prediction modes are available for 4×4 blocks and 36 intra prediction modes for 8×8 blocks. In DC mode, the neighboring pixel values are used in intra prediction for the current pixel.

In SVC, the difference domain may refer to a set of difference pixels formed by subtracting the reconstructed base layer pixels from the reconstructed pixels in the enhancement layer, or vice versa. As explained above, difference domain can be used for intra prediction. In difference intra prediction, the current prediction unit (PU) as well as neighboring difference domain pixels are generated by subtracting the enhancement layer reconstructed signal from the corresponding base layer pixels, or vice versa. The farther the relative distance of neighboring samples (used for prediction) with respect to current prediction pixels, the bigger the prediction error. Therefore, for the samples far from the left and top block border, it would be advantageous to use co-located base layer pixels (e.g., located in a corresponding position in the base layer) for prediction instead of enhancement layer neighboring prediction.

The techniques described in this disclosure may address issues relating to intra prediction in SVC. The techniques described in this disclosure may be especially applicable in the difference domain. Intra Prediction and Intra-BL prediction modes may be combined by applying a weight to each Intra Prediction and Intra BL calculation. Each weight may have a fixed value that is applied to an entire prediction block. Each weight may also be adaptive, or determined individually according to some other parameter. An adaptive weight value may be determined based upon the sample location in the prediction block. For example, more weight can be given to an Intra Prediction weight for the samples which are close to the left and/or top boundary, and more weight can be given to an Intra BL weight for the samples that are far from the left and the top boundary.

The techniques described in this disclosure may also address other issues relating to different domain intra prediction in SVC. In DC prediction, the techniques may use the DC values of the co-located pixel's base layer prediction unit pixels in predicting the value of the current pixel. For example, the DC values based on the co-located base layer pixels may be used if the current pixel does not have certain neighbors, or if the current pixel's neighboring pixels are unavailable. The techniques may also choose not to apply a smoothing filter to neighboring pixels for difference domain intra prediction. For example, the smoothing filter may be applied through the Mode Dependent Intra Smoothing (MDIS) provided in HEVC. The techniques may also choose to use difference domain intra prediction only in spatial scalability cases. For example, difference domain intra prediction may not be used in SNR (signal-to-noise ratio), or quality, scalability cases.

Various aspects of the novel systems, apparatuses, and methods are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the novel systems, apparatuses, and methods disclosed herein, whether implemented independently of, or combined with, any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

FIG. 1 is a block diagram illustrating an example video encoding and decoding system that may utilize techniques in accordance with aspects described in this disclosure. As shown in FIG. 1, system 10 includes a source device 12 that provides encoded video data to be decoded at a later time by a destination device 14. In particular, source device 12 provides the video data to destination device 14 via a computer-readable medium 16. Source device 12 and destination device 14 may comprise any of a wide range of devices, including desktop computers, notebook (e.g., laptop) computers, tablet computers, set-top boxes, telephone handsets such as so-called "smart" phones, so-called "smart" pads, televisions, cameras, display devices, digital media players, video gaming consoles, video streaming device, or the like. In some cases, source device 12 and destination device 14 may be equipped for wireless communication.

Destination device 14 may receive the encoded video data to be decoded via computer-readable medium 16. Computer-readable medium 16 may comprise any type of medium or device capable of moving the encoded video data from source device 12 to destination device 14. In one example, computer-readable medium 16 may comprise a communication medium to enable source device 12 to transmit encoded video data directly to destination device 14 in real-time. The encoded video data may be modulated according to a communication standard, such as a wireless communication protocol, and transmitted to destination device 14. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 12 to destination device 14.

In some examples, encoded data may be output from output interface 22 to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device 12. Destination device 14 may access stored video data from the storage device via streaming or download. The file server may be any type of server capable of storing encoded video data and transmitting that encoded video data to the destination device 14. Example file servers include a web server (e.g., for a website), an FTP server, network attached storage (NAS) devices, or a local disk drive. Destination device 14 may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system 10 may be configured to support one-way or two-way video transmission to support applications such as video streaming, video playback, video broadcasting, and/or video telephony.

In the example of FIG. 1, source device 12 includes video source 18, video encoder 20, and output interface 22. Destination device 14 includes input interface 28, video decoder 30, and display device 32. In accordance with this disclosure, video encoder 20 of source device 12 may be configured to apply the techniques for coding a bitstream including video data conforming to multiple standards or standard extensions. In other examples, a source device and a destination device may include other components or arrangements. For example, source device 12 may receive video data from an external video source 18, such as an external camera. Likewise, destination device 14 may interface with an external display device, rather than including an integrated display device.

The illustrated system 10 of FIG. 1 is merely one example. Techniques for determining candidates for a candidate list for motion vector predictors for a current block may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device 12 and destination device 14 are merely examples of such coding devices in which source device 12 generates coded video data for transmission to destination device 14. In some examples, devices 12, 14 may operate in a substantially symmetrical manner such that each of devices 12, 14 include video encoding and decoding components. Hence, system 10 may support one-way or two-way video transmission between video devices 12, 14, e.g., for video streaming, video playback, video broadcasting, or video telephony.

Video source 18 of source device 12 may include a video capture device, such as a video camera, a video archive containing previously captured video, and/or a video feed interface to receive video from a video content provider. As a further alternative, video source 18 may generate computer graphics-based data as the source video, or a combination of live video, archived video, and computer-generated video. In some cases, if video source 18 is a video camera, source device 12 and destination device 14 may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by video encoder 20. The encoded video information may then be output by output interface 22 onto a computer-readable medium 16.

Computer-readable medium 16 may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from source device 12 and provide the encoded video data to destination device 14, e.g., via network transmission, direct wired communication, etc. Similarly, a computing device of a medium production facility, such as a disc stamping facility, may receive encoded video data from source device 12 and produce a disc containing the encoded video data. Therefore, computer-readable medium 16 may be understood to include one or more computer-readable media of various forms, in various examples.

Input interface 28 of destination device 14 receives information from computer-readable medium 16. The information of computer-readable medium 16 may include syntax information defined by video encoder 20, which is also used by video decoder 30, that includes syntax elements that describe characteristics and/or processing of blocks and other coded units, e.g., GOPs. Display device 32 displays the decoded video data to a user, and may comprise any of a variety of display devices such as a cathode ray tube (CRT), a liquid crystal display (LCD), a plasma display, an organic light emitting diode (OLED) display, or another type of display device.

Video encoder 20 and video decoder 30 may operate according to a video coding standard, such as the High Efficiency Video Coding (HEVC) standard presently under development, and may conform to the HEVC Test Model (HM). Alternatively, video encoder 20 and video decoder 30 may operate according to other proprietary or industry standards, such as the ITU-T H.264 standard, alternatively referred to as MPEG-4, Part 10, Advanced Video Coding (AVC), or extensions of such standards. The techniques of this disclosure, however, are not limited to any particular coding standard, including but not limited to any of the standards listed above. Other examples of video coding standards include MPEG-2 and ITU-T H.263. Although not shown in FIG. 1, in some aspects, video encoder 20 and video decoder 30 may each be integrated with an audio encoder and decoder, and may include appropriate MUX-DEMUX units, or other hardware and software, to handle encoding of both audio and video in a common data stream or separate data streams. If applicable, MUX-DEMUX units may conform to the ITU H.223 multiplexer protocol, or other protocols such as the user datagram protocol (UDP).

Video encoder 20 and video decoder 30 each may be implemented as any of a variety of suitable encoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of video encoder 20 and video decoder 30 may be included in one or more encoders or decoders, either of which may be integrated as part of a combined encoder/decoder (CODEC) in a respective device. A device including video encoder 20 and/or video decoder 30 may comprise an integrated circuit, a microprocessor, and/or a wireless communication device, such as a cellular telephone.

The JCT-VC is working on development of the HEVC standard. The HEVC standardization efforts are based on an evolving model of a video coding device referred to as the HEVC Test Model (HM). The HM presumes several additional capabilities of video coding devices relative to existing devices according to, e.g., ITU-T H.264/AVC. For example, whereas H.264 provides nine intra-prediction encoding modes, the HM may provide as many as thirty-three intra-prediction encoding modes.

In general, the working model of the HM describes that a video frame or picture may be divided into a sequence of treeblocks or largest coding units (LCU) that include both luma and chroma samples. Syntax data within a bitstream may define a size for the LCU, which is a largest coding unit in terms of the number of pixels. A slice includes a number of consecutive treeblocks in coding order. A video frame or picture may be partitioned into one or more slices. Each treeblock may be split into coding units (CUs) according to a quadtree. In general, a quadtree data structure includes one node per CU, with a root node corresponding to the treeblock. If a CU is split into four sub-CUs, the node corresponding to the CU includes four leaf nodes, each of which corresponds to one of the sub-CUs.

Each node of the quadtree data structure may provide syntax data for the corresponding CU. For example, a node in the quadtree may include a split flag, indicating whether the CU corresponding to the node is split into sub-CUs. Syntax elements for a CU may be defined recursively, and may depend on whether the CU is split into sub-CUs. If a CU is not split further, it is referred as a leaf-CU. In this disclosure, four sub-CUs of a leaf-CU will also be referred to as leaf-CUs even if there is no explicit splitting of the original leaf-CU. For example, if a CU at 16×16 size is not split further, the four 8×8 sub-CUs will also be referred to as leaf-CUs although the 16×16 CU was never split.

A CU has a similar purpose as a macroblock of the H.264 standard, except that a CU does not have a size distinction. For example, a treeblock may be split into four child nodes (also referred to as sub-CUs), and each child node may in turn be a parent node and be split into another four child nodes. A final, unsplit child node, referred to as a leaf node of the quadtree, comprises a coding node, also referred to as a leaf-CU. Syntax data associated with a coded bitstream may define a maximum number of times a treeblock may be split, referred to as a maximum CU depth, and may also define a minimum size of the coding nodes. Accordingly, a bitstream may also define a smallest coding unit (SCU). This disclosure uses the term "block" to refer to any of a CU, PU, or TU, in the context of HEVC, or similar data structures in the context of other standards (e.g., macroblocks and sub-blocks thereof in H.264/AVC).

A CU includes a coding node and prediction units (PUs) and transform units (TUs) associated with the coding node. A size of the CU corresponds to a size of the coding node and must be square in shape. The size of the CU may range from 8×8 pixels up to the size of the treeblock with a maximum of 64×64 pixels or greater. Each CU may contain one or more PUs and one or more TUs. Syntax data associated with a CU may describe, for example, partitioning of the CU into one or more PUs. Partitioning modes may differ between whether the CU is skip or direct mode encoded, intra-prediction mode encoded, or inter-prediction mode encoded. PUs may be partitioned to be non-square in shape. Syntax data associated with a CU may also describe, for example, partitioning of the CU into one or more TUs according to a quadtree. A TU can be square or non-square (e.g., rectangular) in shape.

The HEVC standard allows for transformations according to TUs, which may be different for different CUs. The TUs are typically sized based on the size of PUs within a given CU defined for a partitioned LCU, although this may not always be the case. The TUs are typically the same size or smaller than the PUs. In some examples, residual samples corresponding to a CU may be subdivided into smaller units using a quadtree structure known as "residual quad tree" (RQT). The leaf nodes of the RQT may be referred to as transform units (TUs). Pixel difference values associated with the TUs may be transformed to produce transform coefficients, which may be quantized.

A leaf-CU may include one or more prediction units (PUs). In general, a PU represents a spatial area corresponding to all or a portion of the corresponding CU, and may include data for retrieving a reference sample for the PU. Moreover, a PU includes data related to prediction. For example, when the PU is intra-mode encoded, data for the PU may be included in a residual quadtree (RQT), which may include data describing an intra-prediction mode for a TU corresponding to the PU. As another example, when the PU is inter-mode encoded, the PU may include data defining one or more motion vectors for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

A leaf-CU having one or more PUs may also include one or more transform units (TUs). The transform units may be specified using an RQT (also referred to as a TU quadtree structure), as discussed above. For example, a split flag may indicate whether a leaf-CU is split into four transform units. Then, each transform unit may be split further into further sub-TUs. When a TU is not split further, it may be referred to as a leaf-TU. Generally, for intra coding, all the leaf-TUs belonging to a leaf-CU share the same intra prediction mode. That is, the same intra-prediction mode is generally applied to calculate predicted values for all TUs of a leaf-CU. For intra coding, a video encoder may calculate a residual value for each leaf-TU using the intra prediction mode, as a difference between the portion of the CU corresponding to the TU and the original block. A TU is not necessarily limited to the size of a PU. Thus, TUs may be larger or smaller than a PU. For intra coding, a PU may be collocated with a corresponding leaf-TU for the same CU. In some examples, the maximum size of a leaf-TU may correspond to the size of the corresponding leaf-CU.

Moreover, TUs of leaf-CUs may also be associated with respective quadtree data structures, referred to as residual quadtrees (RQTs). That is, a leaf-CU may include a quadtree indicating how the leaf-CU is partitioned into TUs. The root node of a TU quadtree generally corresponds to a leaf-CU, while the root node of a CU quadtree generally corresponds to a treeblock (or LCU). TUs of the RQT that are not split are referred to as leaf-TUs. In general, this disclosure uses the terms CU and TU to refer to leaf-CU and leaf-TU, respectively, unless noted otherwise.

A video sequence typically includes a series of video frames or pictures. A group of pictures (GOP) generally comprises a series of one or more of the video pictures. A GOP may include syntax data in a header of the GOP, a header of one or more of the pictures, or elsewhere, that describes a number of pictures included in the GOP. Each slice of a picture may include slice syntax data that describes an encoding mode for the respective slice. Video encoder 20 typically operates on video blocks within individual video slices in order to encode the video data. A video block may correspond to a coding node within a CU. The video blocks may have fixed or varying sizes, and may differ in size according to a specified coding standard.

As an example, the HM supports prediction in various PU sizes. Assuming that the size of a particular CU is 2N×2N, the HM supports intra-prediction in PU sizes of 2N×2N or N×N, and inter-prediction in symmetric PU sizes of 2N×2N, 2N×N, N×2N, or N×N. The HIM also supports asymmetric partitioning for inter-prediction in PU sizes of 2N×nU, 2N×nD, nL×2N, and nR×2N. In asymmetric partitioning, one direction of a CU is not partitioned, while the other direction is partitioned into 25% and 75%. The portion of the CU corresponding to the 25% partition is indicated by an "n" followed by an indication of "Up," "Down," "Left," or "Right." Thus, for example, "2N×nU" refers to a 2N×2N CU that is partitioned horizontally with a 2N×0.5N PU on top and a 2N×1.5N PU on bottom.

In this disclosure, "N×N" and "N by N" may be used interchangeably to refer to the pixel dimensions of a video block in terms of vertical and horizontal dimensions, e.g., 16×16 pixels or 16 by 16 pixels. In general, a 16×16 block will have 16 pixels in a vertical direction (y=16) and 16 pixels in a horizontal direction (x=16). Likewise, an N×N block generally has N pixels in a vertical direction and N pixels in a horizontal direction, where N represents a non-negative integer value. The pixels in a block may be arranged in rows and columns. Moreover, blocks need not necessarily have the same number of pixels in the horizontal direction as in the vertical direction. For example, blocks may comprise N×M pixels, where M is not necessarily equal to N.

Following intra-predictive or inter-predictive coding using the PUs of a CU, video encoder 20 may calculate residual data for the TUs of the CU. The PUs may comprise syntax data describing a method or mode of generating predictive pixel data in the spatial domain (also referred to as the pixel domain) and the TUs may comprise coefficients in the transform domain following application of a transform, e.g., a discrete cosine transform (DCT), an integer transform, a wavelet transform, or a conceptually similar transform to residual video data. The residual data may correspond to pixel differences between pixels of the unencoded picture and prediction values corresponding to the PUs. Video encoder 20 may form the TUs including the residual data for the CU, and then transform the TUs to produce transform coefficients for the CU.

Following any transforms to produce transform coefficients, video encoder 20 may perform quantization of the transform coefficients. Quantization generally refers to a process in which transform coefficients are quantized to possibly reduce the amount of data used to represent the coefficients, providing further compression. The quantization process may reduce the bit depth associated with some or all of the coefficients. For example, an n-bit value may be rounded down to an m-bit value during quantization, where n is greater than m.

Following quantization, the video encoder may scan the transform coefficients, producing a one-dimensional vector from the two-dimensional matrix including the quantized transform coefficients. The scan may be designed to place higher energy (and therefore lower frequency) coefficients at the front of the array and to place lower energy (and therefore higher frequency) coefficients at the back of the array. In some examples, video encoder 20 may utilize a predefined scan order to scan the quantized transform coefficients to produce a serialized vector that can be entropy encoded. In other examples, video encoder 20 may perform an adaptive scan. After scanning the quantized transform coefficients to form a one-dimensional vector, video encoder 20 may entropy encode the one-dimensional vector, e.g., according to context-adaptive variable length coding (CAVLC), context-adaptive binary arithmetic coding (CABAC), syntax-based context-adaptive binary arithmetic coding (SBAC), Probability Interval Partitioning Entropy (PIPE) coding or another entropy encoding methodology. Video encoder 20 may also entropy encode syntax elements associated with the encoded video data for use by video decoder 30 in decoding the video data.

To perform CABAC, video encoder 20 may assign a context within a context model to a symbol to be transmitted. The context may relate to, for example, whether neighboring values of the symbol are non-zero or not. To perform CAVLC, video encoder 20 may select a variable length code for a symbol to be transmitted. Codewords in VLC may be constructed such that relatively shorter codes correspond to more probable symbols, while longer codes correspond to less probable symbols. In this way, the use of VLC may achieve a bit savings over, for example, using equal-length codewords for each symbol to be transmitted. The probability determination may be based on a context assigned to the symbol.

Video encoder 20 may further send syntax data, such as block-based syntax data, frame-based syntax data, and GOP-based syntax data, to video decoder 30, e.g., in a frame header, a block header, a slice header, or a GOP header. The GOP syntax data may describe a number of frames in the respective GOP, and the frame syntax data may indicate an encoding/prediction mode used to encode the corresponding frame.

Figure 2:
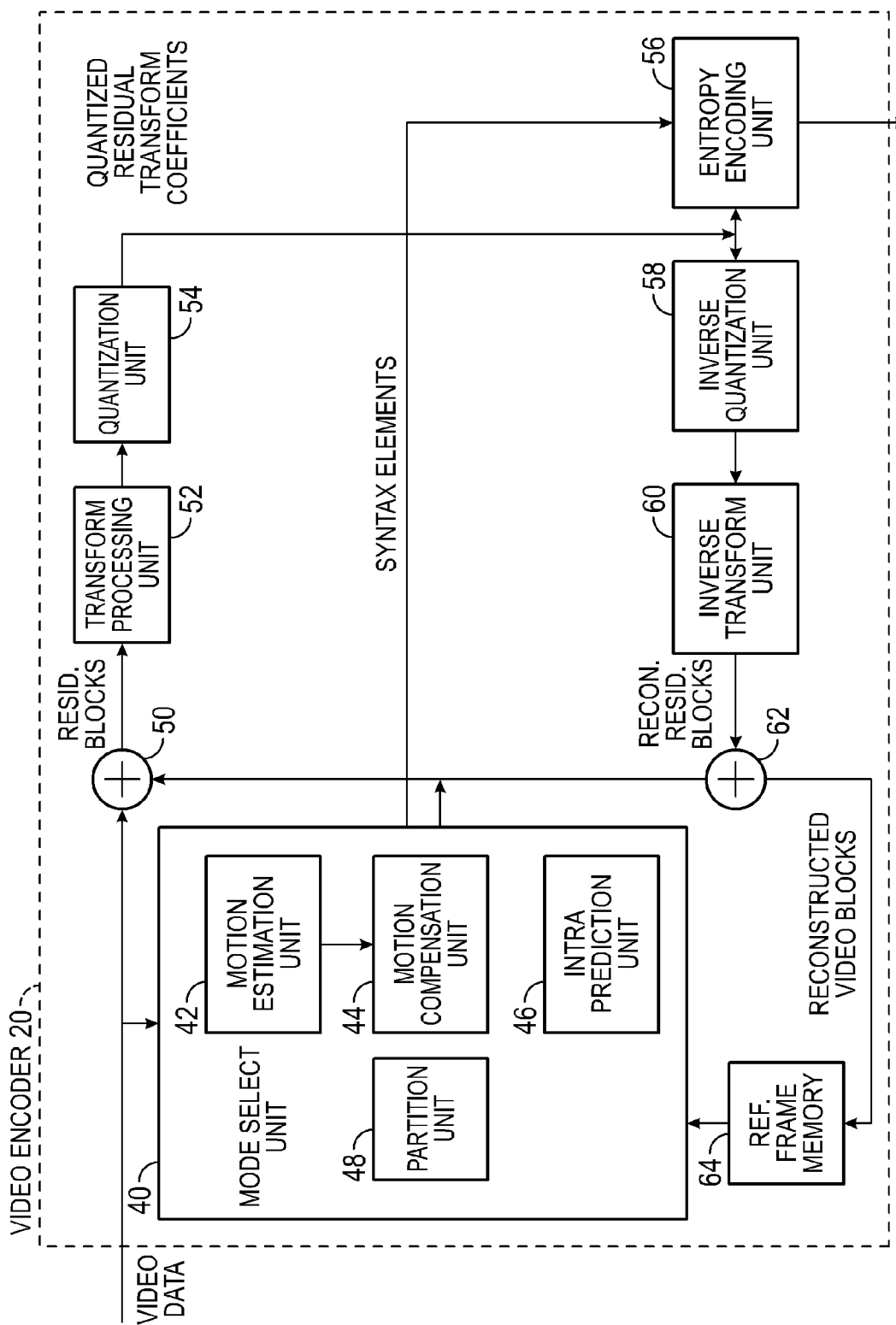
FIG. 2 is a block diagram illustrating an example of a video encoder that may implement techniques in accordance with aspects described in this disclosure.

FIG. 2 is a block diagram illustrating an example of a video encoder that may implement techniques in accordance with aspects described in this disclosure. Video encoder 20 may be configured to perform any or all of the techniques of this disclosure. As one example, mode select unit 40 may be configured to perform any or all of the techniques described in this disclosure. However, aspects of this disclosure are not so limited. In some examples, the techniques described in this disclosure may be shared among the various components of video encoder 20. In some examples, in addition to or instead of, a processor (not shown) may be configured to perform any or all of the techniques described in this disclosure.

In some embodiments, the mode select unit 40, the intra prediction unit 46 (or another component of the mode select unit 40, shown or not shown), or another component of the encoder 20 (shown or not shown) may perform the techniques of this disclosure. For example, the mode select unit 40 may receive video data for encoding, which may be encoded into a reference layer (e.g., base layer) and corresponding one or more enhancement layers. The mode select unit 40, the intra prediction unit 46, or another appropriate unit of the encoder 20 may determine a value of a video unit positioned at a position within the enhancement layer based at least in part on an intra prediction value based on at least one additional video unit in the enhancement layer and a value of a co-located video unit in the reference layer. The intra prediction value based on the at least one additional video unit in the enhancement layer can be weighted by a first weighting factor. The value of the co-located video unit in the reference layer can be weighted by a second weighting factor. The encoder 20 may be configured to encode data relating to the video unit. The encoder 20 may be further configured to encode and signal the first weighting factor and the second weighting factor, or information relating to the first weighting factor and the second weighting factor, in a bitstream.

In certain embodiments, the mode select unit 40, the intra prediction unit 46 (or another component of the mode select unit 40, shown or not shown), or another component of the encoder 20 (shown or not shown) may determine a prediction value of a pixel in the enhancement layer based at least in part on an average value of a plurality of pixels in the reference layer. The encoder 20 can encode data relating to the pixel and signal the encoded data in a bitstream.

In other embodiments, the mode select unit 40, the intra prediction unit 46 (or another component of the mode select unit 40, shown or not shown), or another component of the encoder 20 (shown or not shown) may apply a smoothing filter to a video unit in the enhancement layer and at least one additional video unit adjacent to the video unit when the video unit is a pixel value. The encoder 20 can encode data relating to the video unit and signal the encoded data in a bistream.

In some embodiments, the mode select unit 40, the intra prediction unit 46 (or another component of the mode select unit 40, shown or not shown), or another component of the encoder 20 (shown or not shown) may determine a value of a video unit positioned at a position within the enhancement layer based at least in part on a difference video layer. The difference video layer of pixel information may be derived from a difference between an enhancement layer and a corresponding reference layer. A first spatial resolution can be associated with the enhancement layer, and a second spatial resolution can be associated with the reference layer. When the first spatial resolution is not equal to the second spatial resolution, the encoder 20 may determine the value of the video unit in the EL based at least in part on the difference video layer. When the first spatial resolution is equal to the second spatial resolution, the encoder 20 may refrain from determining the value of the video unit based at least in part on the difference video layer. The encoder 20 can encode data relating to the video unit and signal the encoded data in a bistream. The encoder 20 can also encode and signal a flag indicating whether the difference video layer is used for intra prediction in the bitstream.

Video encoder 20 may perform intra- and inter-coding of video blocks within video slices. Intra-coding relies on spatial prediction to reduce or remove spatial redundancy in video within a given video frame or picture. Inter-coding relies on temporal prediction to reduce or remove temporal redundancy in video within adjacent frames or pictures of a video sequence. Intra-mode (I mode) may refer to any of several spatial based coding modes. Inter-modes, such as uni-directional prediction (P mode) or bi-prediction (B mode), may refer to any of several temporal-based coding modes.

As shown in FIG. 2, video encoder 20 receives a current video block within a video frame to be encoded. In the example of FIG. 1, video encoder 20 includes mode select unit 40, reference frame memory 64, summer 50, transform processing unit 52, quantization unit 54, and entropy encoding unit 56. Mode select unit 40, in turn, includes motion compensation unit 44, motion estimation unit 42, intra-prediction unit 46, and partition unit 48. For video block reconstruction, video encoder 20 also includes inverse quantization unit 58, inverse transform unit 60, and summer 62. A deblocking filter (not shown in FIG. 2) may also be included to filter block boundaries to remove blockiness artifacts from reconstructed video. If desired, the deblocking filter would typically filter the output of summer 62. Additional filters (in loop or post loop) may also be used in addition to the deblocking filter. Such filters are not shown for brevity, but if desired, may filter the output of summer 50 (as an in-loop filter).

During the encoding process, video encoder 20 receives a video frame or slice to be coded. The frame or slice may be divided into multiple video blocks. Motion estimation unit 42 and motion compensation unit 44 perform inter-predictive coding of the received video block relative to one or more blocks in one or more reference frames to provide temporal prediction. Intra-prediction unit 46 may alternatively perform intra-predictive coding of the received video block relative to one or more neighboring blocks in the same frame or slice as the block to be coded to provide spatial prediction. Video encoder 20 may perform multiple coding passes, e.g., to select an appropriate coding mode for each block of video data.

Moreover, partition unit 48 may partition blocks of video data into sub-blocks, based on evaluation of previous partitioning schemes in previous coding passes. For example, partition unit 48 may initially partition a frame or slice into LCUs, and partition each of the LCUs into sub-CUs based on rate-distortion analysis (e.g., rate-distortion optimization). Mode select unit 40 may further produce a quadtree data structure indicative of partitioning of an LCU into sub-CUs. Leaf-node CUs of the quadtree may include one or more PUs and one or more TUs.

Mode select unit 40 may select one of the coding modes, intra or inter, e.g., based on error results, and provides the resulting intra- or inter-coded block to summer 50 to generate residual block data and to summer 62 to reconstruct the encoded block for use as a reference frame. Mode select unit 40 also provides syntax elements, such as motion vectors, intra-mode indicators, partition information, and other such syntax information, to entropy encoding unit 56.

Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a PU of a video block within a current video frame or picture relative to a predictive block within a reference frame (or other coded unit) relative to the current block being coded within the current frame (or other coded unit). A predictive block is a block that is found to closely match the block to be coded, in terms of pixel difference, which may be determined by sum of absolute difference (SAD), sum of square difference (SSD), or other difference metrics. In some examples, video encoder 20 may calculate values for sub-integer pixel positions of reference pictures stored in reference frame memory 64. For example, video encoder 20 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in reference frame memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation unit 42. Again, motion estimation unit 42 and motion compensation unit 44 may be functionally integrated, in some examples. Upon receiving the motion vector for the PU of the current video block, motion compensation unit 44 may locate the predictive block to which the motion vector points in one of the reference picture lists. Summer 50 forms a residual video block by subtracting pixel values of the predictive block from the pixel values of the current video block being coded, forming pixel difference values, as discussed below. In general, motion estimation unit 42 performs motion estimation relative to luma components, and motion compensation unit 44 uses motion vectors calculated based on the luma components for both chroma components and luma components. Mode select unit 40 may also generate syntax elements associated with the video blocks and the video slice for use by video decoder 30 in decoding the video blocks of the video slice.

Intra-prediction unit 46 may intra-predict a current block, as an alternative to the inter-prediction performed by motion estimation unit 42 and motion compensation unit 44, as described above. In particular, intra-prediction unit 46 may determine an intra-prediction mode to use to encode a current block. In some examples, intra-prediction unit 46 may encode a current block using various intra-prediction modes, e.g., during separate encoding passes, and intra-prediction unit 46 (or mode select unit 40, in some examples) may select an appropriate intra-prediction mode to use from the tested modes.

For example, intra-prediction unit 46 may calculate rate-distortion values using a rate-distortion analysis for the various tested intra-prediction modes, and select the intra-prediction mode having the best rate-distortion characteristics among the tested modes. Rate-distortion analysis generally determines an amount of distortion (or error) between an encoded block and an original, unencoded block that was encoded to produce the encoded block, as well as a bitrate (that is, a number of bits) used to produce the encoded block. Intra-prediction unit 46 may calculate ratios from the distortions and rates for the various encoded blocks to determine which intra-prediction mode exhibits the best rate-distortion value for the block.

After selecting an intra-prediction mode for a block, intra-prediction unit 46 may provide information indicative of the selected intra-prediction mode for the block to entropy encoding unit 56. Entropy encoding unit 56 may encode the information indicating the selected intra-prediction mode. Video encoder 20 may include in the transmitted bitstream configuration data, which may include a plurality of intra-prediction mode index tables and a plurality of modified intra-prediction mode index tables (also referred to as codeword mapping tables), definitions of encoding contexts for various blocks, and indications of a most probable intra-prediction mode, an intra-prediction mode index table, and a modified intra-prediction mode index table to use for each of the contexts.

Video encoder 20 forms a residual video block by subtracting the prediction data from mode select unit 40 from the original video block being coded. Summer 50 represents the component or components that perform this subtraction operation. Transform processing unit 52 applies a transform, such as a discrete cosine transform (DCT) or a conceptually similar transform, to the residual block, producing a video block comprising residual transform coefficient values. Transform processing unit 52 may perform other transforms which are conceptually similar to DCT. Wavelet transforms, integer transforms, sub-band transforms or other types of transforms could also be used. In any case, transform processing unit 52 applies the transform to the residual block, producing a block of residual transform coefficients. The transform may convert the residual information from a pixel value domain to a transform domain, such as a frequency domain. Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy codes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy coding technique. In the case of context-based entropy coding, context may be based on neighboring blocks. Following the entropy coding by entropy encoding unit 56, the encoded bitstream may be transmitted to another device (e.g., video decoder 30) or archived for later transmission or retrieval.

Inverse quantization unit 58 and inverse transform unit 60 apply inverse quantization and inverse transformation, respectively, to reconstruct the residual block in the pixel domain, e.g., for later use as a reference block. Motion compensation unit 44 may calculate a reference block by adding the residual block to a predictive block of one of the frames of reference frame memory 64. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reconstructed video block for storage in reference frame memory 64. The reconstructed video block may be used by motion estimation unit 42 and motion compensation unit 44 as a reference block to inter-code a block in a subsequent video frame.

Figure 3:
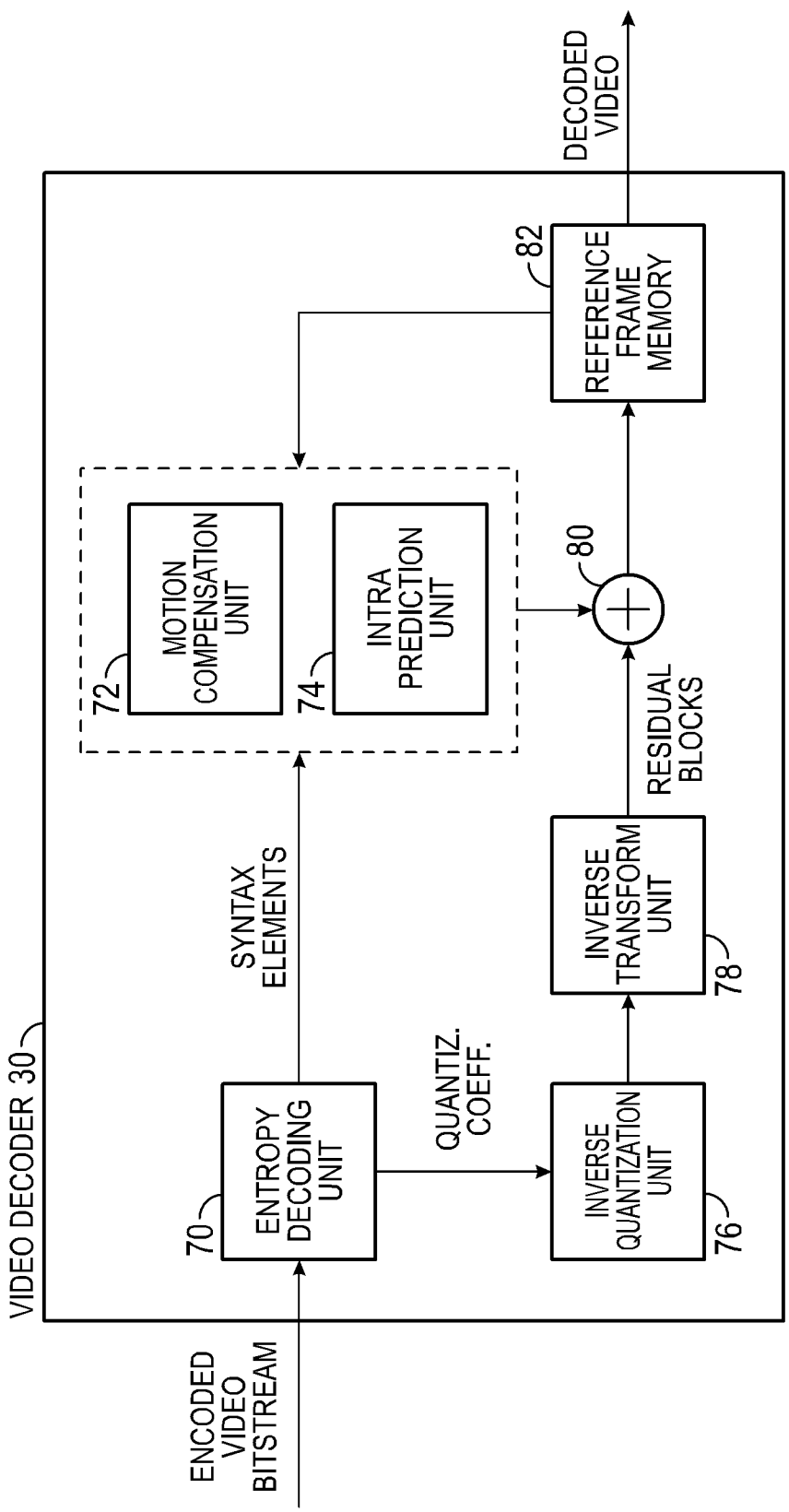
FIG. 3 is a block diagram illustrating an example of a video decoder that may implement techniques in accordance with aspects described in this disclosure.

FIG. 3 is a block diagram illustrating an example of a video decoder that may implement techniques in accordance with aspects described in this disclosure. Video decoder 30 may be configured to perform any or all of the techniques of this disclosure. As one example, motion compensation unit 72 and/or intra prediction unit 74 may be configured to perform any or all of the techniques described in this disclosure. However, aspects of this disclosure are not so limited. In some examples, the techniques described in this disclosure may be shared among the various components of video decoder 30. In some examples, in addition to or instead of, a processor (not shown) may be configured to perform any or all of the techniques described in this disclosure.

In some embodiments, the entropy decoding unit 70, the intra prediction unit 74, or another component of the decoder 30 (shown or not shown) may perform the techniques of this disclosure. For example, the entropy decoding unit 70 may receive an encoded video bitstream, which may encode data relating to a reference layer (e.g., base layer) and corresponding one or more enhancement layers. The intra prediction unit 74 or another appropriate unit of the decoder 30 may determine a value of a video unit positioned at a position within the enhancement layer based at least in part on an intra prediction value based on at least one additional video unit in the enhancement layer and a value of a co-located video unit in the reference layer. The intra prediction value based on the at least one additional video unit in the enhancement layer can be weighted by a first weighting factor. The value of the co-located video unit in the reference layer can be weighted by a second weighting factor. The entropy decoding unit 70 or another component of the decoder 30 may be configured to decode the video unit and to receive the first weighting factor and the second weighting factor, or information relating to the first weighting factor and the second weighting factor, in a bitstream. In one embodiment, the decoder 30 may derive the first weighting factor and the second weighting factor.

In certain embodiments, the entropy decoding unit 70 or another component of the decoder 30 (shown or not shown) may receive an encoded video bitstream. The intra prediction unit 74 or another appropriate unit of the decoder 30 may determine a prediction value of a pixel in the enhancement layer based at least in part on an average value of a plurality of pixels in the reference layer.

In other embodiments, the entropy decoding unit 70 or another component of the decoder 30 (shown or not shown) may receive an encoded video bitstream. The intra prediction unit 74 or another appropriate unit of the decoder 30 may apply a smoothing filter to a video unit in the enhancement layer and at least one additional video unit adjacent to the video unit when the video unit is a pixel value.

In some embodiments, the entropy decoding unit 70 or another component of the decoder 30 (shown or not shown) may receive an encoded video bitstream. The intra prediction unit 74 or another appropriate unit of the decoder 30 may determine a value of a video unit positioned at a position within the enhancement layer based at least in part on a difference video layer. The difference video layer of pixel information may be derived from a difference between an enhancement layer and a corresponding reference layer. A first spatial resolution can be associated with the enhancement layer, and a second spatial resolution can be associated with the reference layer. When the first spatial resolution is not equal to the second spatial resolution, the decoder 30 may determine the value of the video unit in the EL based at least in part on the difference video layer. When the first spatial resolution is equal to the second spatial resolution, the decoder 30 may refrain from determining the value of the video unit based at least in part on the difference video layer.

In the example of FIG. 3, video decoder 30 includes an entropy decoding unit 70, motion compensation unit 72, intra prediction unit 74, inverse quantization unit 76, inverse transformation unit 78, reference frame memory 82 and summer 80. Video decoder 30 may, in some examples, perform a decoding pass generally reciprocal to the encoding pass described with respect to video encoder 20 (FIG. 2). Motion compensation unit 72 may generate prediction data based on motion vectors received from entropy decoding unit 70, while intra-prediction unit 74 may generate prediction data based on intra-prediction mode indicators received from entropy decoding unit 70.

During the decoding process, video decoder 30 receives an encoded video bitstream that represents video blocks of an encoded video slice and associated syntax elements from video encoder 20. Entropy decoding unit 70 of video decoder 30 entropy decodes the bitstream to generate quantized coefficients, motion vectors or intra-prediction mode indicators, and other syntax elements. Entropy decoding unit 70 forwards the motion vectors to and other syntax elements to motion compensation unit 72. Video decoder 30 may receive the syntax elements at the video slice level and/or the video block level.

When the video slice is coded as an intra-coded (I) slice, intra prediction unit 74 may generate prediction data for a video block of the current video slice based on a signaled intra prediction mode and data from previously decoded blocks of the current frame or picture. When the video frame is coded as an inter-coded (e.g., B, P or GPB) slice, motion compensation unit 72 produces predictive blocks for a video block of the current video slice based on the motion vectors and other syntax elements received from entropy decoding unit 70. The predictive blocks may be produced from one of the reference pictures within one of the reference picture lists. Video decoder 30 may construct the reference frame lists, List 0 and List 1, using default construction techniques based on reference pictures stored in reference frame memory 82. Motion compensation unit 72 determines prediction information for a video block of the current video slice by parsing the motion vectors and other syntax elements, and uses the prediction information to produce the predictive blocks for the current video block being decoded.

For example, motion compensation unit 72 uses some of the received syntax elements to determine a prediction mode (e.g., intra- or inter-prediction) used to code the video blocks of the video slice, an inter-prediction slice type (e.g., B slice, P slice, or GPB slice), construction information for one or more of the reference picture lists for the slice, motion vectors for each inter-encoded video block of the slice, inter-prediction status for each inter-coded video block of the slice, and other information to decode the video blocks in the current video slice.

Motion compensation unit 72 may also perform interpolation based on interpolation filters. Motion compensation unit 72 may use interpolation filters as used by video encoder 20 during encoding of the video blocks to calculate interpolated values for sub-integer pixels of reference blocks. In this case, motion compensation unit 72 may determine the interpolation filters used by video encoder 20 from the received syntax elements and use the interpolation filters to produce predictive blocks.

Inverse quantization unit 76 inverse quantizes, e.g., de-quantizes, the quantized transform coefficients provided in the bitstream and decoded by entropy decoding unit 80. The inverse quantization process may include use of a quantization parameter $QP_Y$ calculated by video decoder 30 for each video block in the video slice to determine a degree of quantization and, likewise, a degree of inverse quantization that should be applied.

Inverse transform unit 78 applies an inverse transform, e.g., an inverse DCT, an inverse integer transform, or a conceptually similar inverse transform process, to the transform coefficients in order to produce residual blocks in the pixel domain.

After motion compensation unit 72 generates the predictive block for the current video block based on the motion vectors and other syntax elements, video decoder 30 forms a decoded video block by summing the residual blocks from inverse transform unit 78 with the corresponding predictive blocks generated by motion compensation unit 72. Summer 80 represents the component or components that perform this summation operation. If desired, a deblocking filter may also be applied to filter the decoded blocks in order to remove blockiness artifacts. Other loop filters (either in the coding loop or after the coding loop) may also be used to smooth pixel transitions, or otherwise improve the video quality. The decoded video blocks in a given frame or picture are then stored in reference frame memory 82, which stores reference pictures used for subsequent motion compensation. Reference frame memory 82 also stores decoded video for later presentation on a display device, such as display device 32 of FIG. 1.

Video Coding Overview

Figure 4:
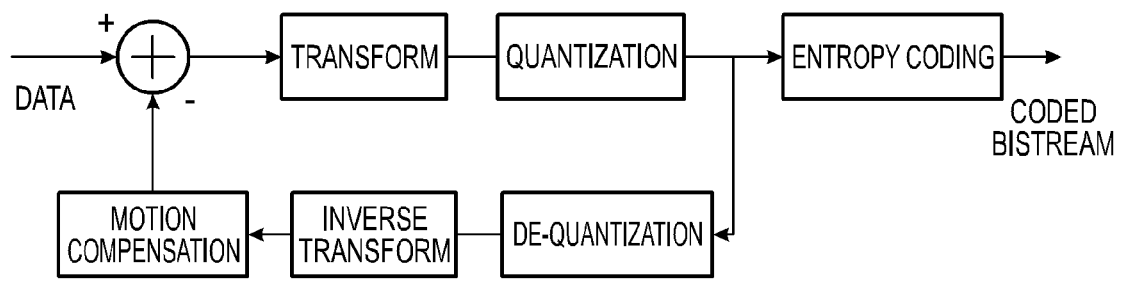
FIG. 4 is a block diagram illustrating an example of a video coder.

In one embodiment, a video coder is configured to implement four coding techniques as shown in FIG. 4, including motion prediction, transform, quantization, and entropy coding. These techniques may be applied to rectangular blocks and/or regions of the frame, such as, but not limited to, a Coding Unit, etc.

A video signal can have temporal redundancy, with high correlation between neighboring frames. Additionally within a frame, image, etc., data can sometimes have spatial redundancy among neighboring pixels. In some situations, a Coding Unit can be configured to take advantage of such spatial redundancy by predicting from spatially located neighboring pixels. In such situations, the CU may be coded as an Intra mode Coding Unit. In other situations, the data can sometimes have temporal redundancy among neighboring frames. In some situations, a CU can be configured to take advantage of such temporal redundancy by predicting motion from neighboring frames. In such situations, the CU may be coded as an Inter mode Coding Unit. The prediction stage is generally loss-less. Coded blocks may then be transformed using any one or more of a variety of techniques, e.g., DCT, etc., to de-correlate signals so that the outputs can be efficiently coded using techniques such as scalar quantization, etc. Further these quantized coefficients may be compressed using entropy coding techniques, such as Arithmetic coding, etc.

In general, coding units encoded in P/B-mode are predicted from one or more of the previously coded frames. For these modes the prediction information of a block is represented by a two-dimensional (2D) motion vector. For the blocks encoded in I-mode, the predicted block is formed using spatial prediction from already encoded neighboring blocks within the same frame. The prediction error, e.g., the difference between the block being encoded and the predicted block is then transformed and quantized. The quantized transform coefficients, together with motion vectors and other control information, form a coded sequence representation and are sometimes referred to as syntax elements. Prior to transmission from the encoder to the decoder, all syntax elements may be entropy coded so as to further reduce the number of bits utilized for their representation.

In the decoder, the block in the current frame is obtained by first constructing its prediction in the same manner as in the encoder and by adding to the prediction the compressed prediction error.

HEVC Intra Prediction

Figure 5:
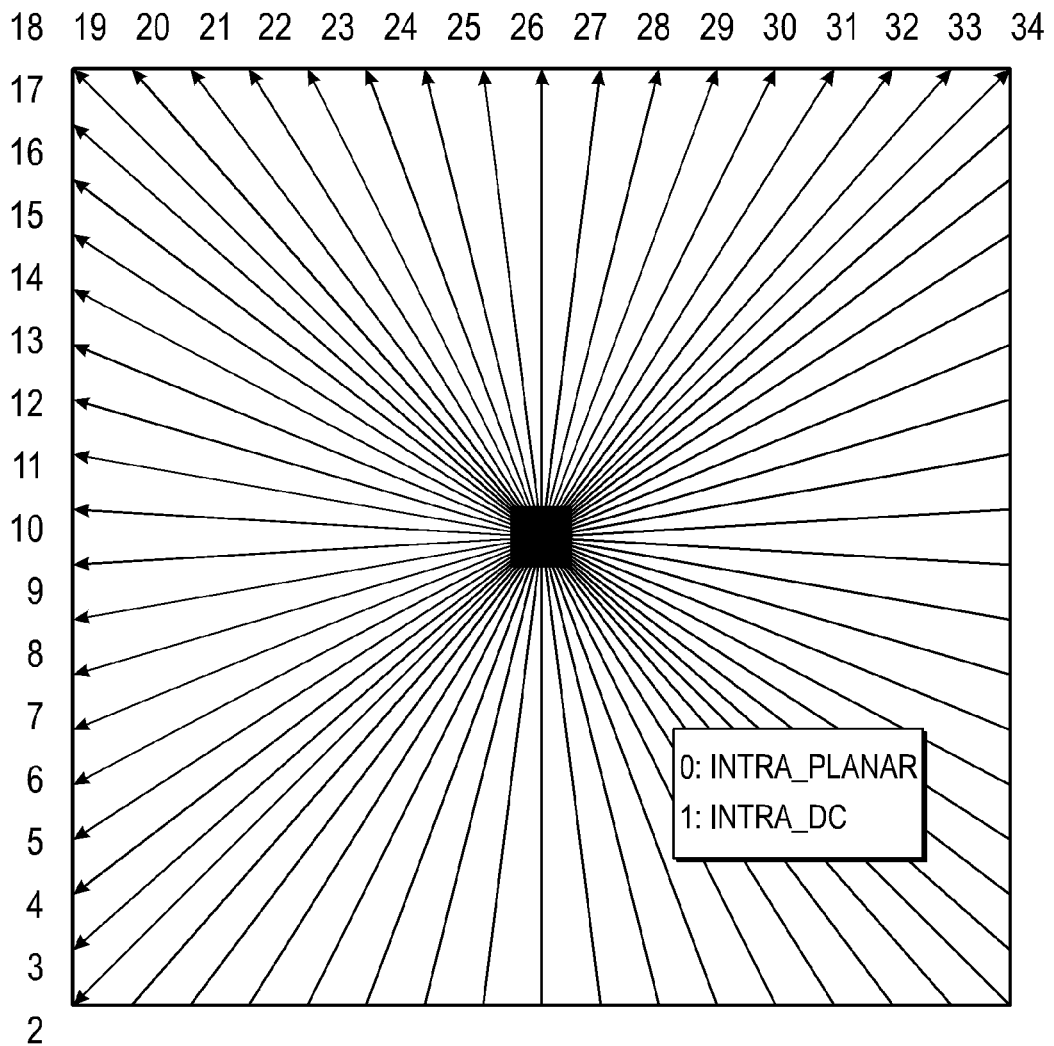
FIG. 5 illustrates various modes for intra prediction.

An intra prediction mode is often used in HEVC to take advantage of existing spatial correlation. HEVC provides 35 modes for all blocks size. FIG. 5 illustrates the 35 modes for intra prediction.

Figures 6, 7:
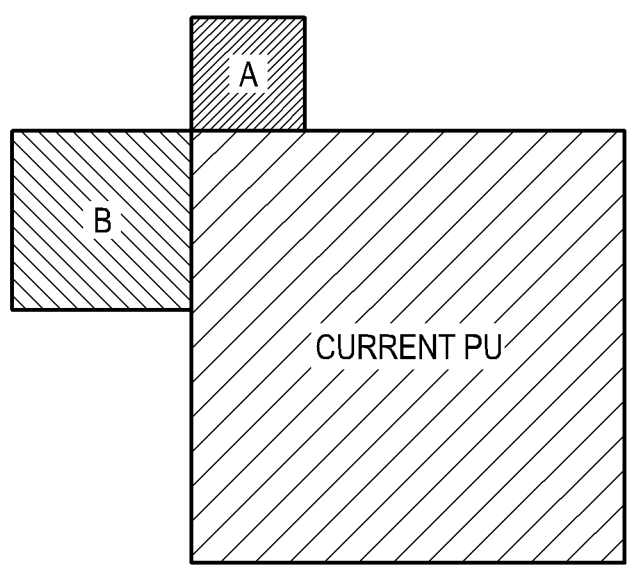
FIG. 6 is a block diagram illustrating a prediction process.
FIG. 7 is a block diagram illustrating a current prediction unit and its neighboring units.

One embodiment of a prediction process is illustrated in FIG. 6. As shown in FIG. 6, pixels "a" to "p" are to be encoded. Pixels "A" to "R" are located in neighboring blocks, and have already been encoded. The neighboring pixels are used for prediction to predict the values of the "a" to "p" pixels. Pixels "A" to "R" may be referred to a neighboring pixels.

If, for example, Mode Vertical is selected, then pixels a, e, i and m are predicted by setting them equal to pixel A, and pixels b, f, j and n are predicted by setting them equal to pixel B, etc. Similarly, if Mode Horizontal is selected, pixels a, b, c and d are predicted by setting them equal to pixel I, and pixels e, f, g and h are predicted by setting them equal to pixel J, etc.

Present Most Probable Mode derivation in HEVC Base Layer

FIG. 7 illustrates one embodiment of a current prediction unit (PU) and neighboring units, "A" and "B." The following describes one embodiment of Most Probable Mode list derivation in an HEVC base layer.

- intraPredModeA = intraPredModeB
  - If intraPredModeA < 2
    - candModeList[0] = Intra_Planar
    - candModeList[1] = Intra_DC
    - candModeList[2] = Intra_Angular (26), (Vertical)
  - Otherwise,
    - candModeList[0] = candIntraPredModeA
    - candModeList[1] = 2 + ( ( candIntraPredModeA − 2 − 1 ) % 32, (closest mode)
    - candModeList[2] = 2 + ( ( candIntraPredModeA − 2 + 1 ) % 32, (closest mode)

-continued

```
· intraPredModeA != intraPredModeB
  - candModeList[0] = intraPredModeA
  - candModeList[1] = intraPredModeB
  - If intraPredModeA!= Intra_Planar AND intraPredModeB!=
    Intra_Planar
      · candModeList[2] = Intra_Planar
  - Otherwise, if intraPredModeA!= Intra_DC AND
    intraPredModeB!= Intra_DC
      · candModeList[2] = Intra_DC
  - Otherwise
      · candModeList[2] = Intra_Angular (26), (Vertical)
```

HEVC Scalable Video Coding Extension

The SVC (Scalable Video Coding) extension to the HEVC codec standard allows sending and receiving multi-layered video streams. The multi-layered video streams may include a small base layer and one or more optional additional layers that can be used to enhance resolution, frame rate and quality.

Figure 8:
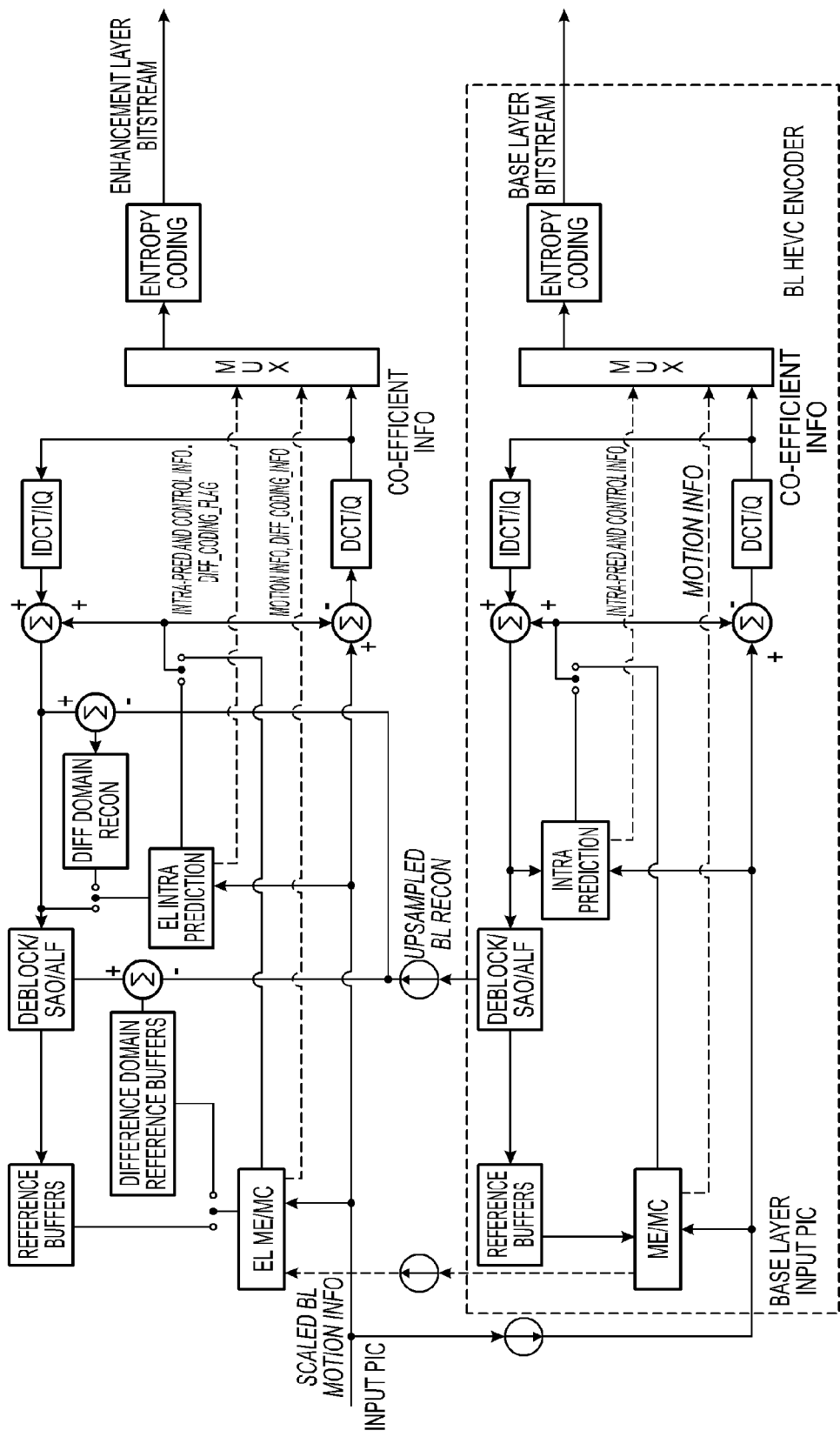
FIG. 8 is a block diagram illustrating enhancement layer difference domain coding and regular pixel domain coding.
Figure 9:
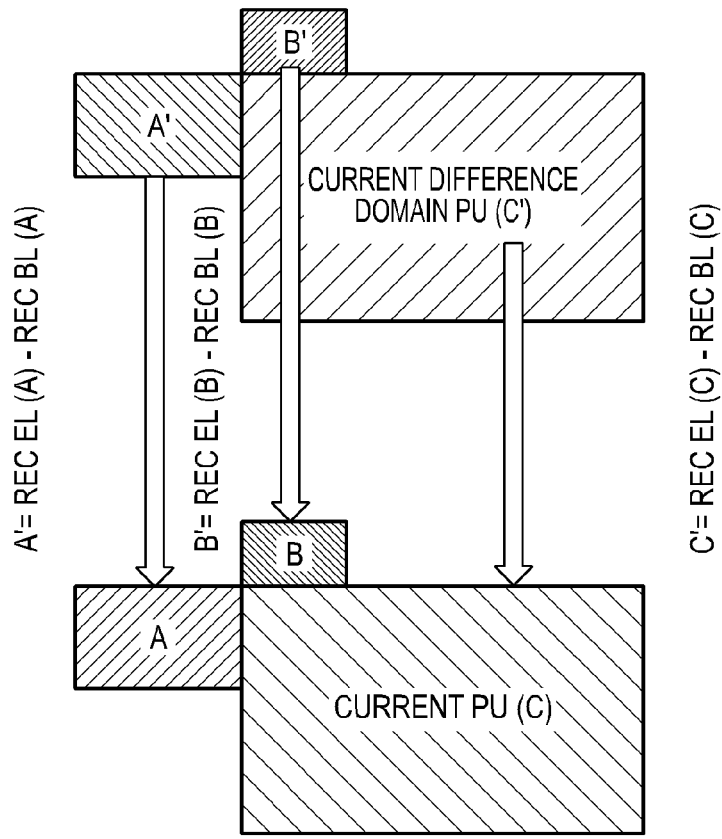
FIG. 9 is a block diagram illustrating use of neighboring values to determine difference domain prediction.

FIG. 8 illustrates one embodiment of enhancement layer difference domain coding and regular pixel domain coding Difference Domain Intra Prediction Coding Difference domain coding Intra Prediction is sometimes implemented by subtracting a current layer picture samples from a corresponding base layer reconstructed picture sample (or upsampled reconstructed picture in case of spatial scalable layer). The resulting difference is used to form a "difference" signal which is further predicted from neighboring difference signal. The difference may be encoded, which often results in better coding efficiency. One embodiment of using neighboring values to determine difference domain prediction is illustrated in FIG. 9.

In one embodiment, a difference domain prediction flag is provided to the decoder to indicate whether difference domain was used. To improve compression efficiency, difference domain prediction can be performed at any granularity level, including those described in the HEVC Compression Draft, including but not limited to frame, slice, LCU, CU, PU, etc. Difference domain prediction flag information may be signaled at any such granularity level.

Combined Intra Prediction and Intra BL Prediction for EL

In one embodiment, Intra Prediction and Intra-BL prediction modes are combined by applying a weight to each Intra Prediction and Intra BL calculation. In some embodiments, each weight has a fixed value that is applied to an entire prediction block. In other embodiments, each weight is adaptive, or determined individually according to some other parameter. For example, in one embodiment, an adaptive weight value is determined based upon the sample location in the prediction block. For example, more weight can be given to an Intra Prediction weight (e.g., the weight is given a larger value) for the samples which are close to the left and/or top boundary, and more weight can be given to an Intra BL weight for the samples that are far from the left and the top boundary.

Figure 10:
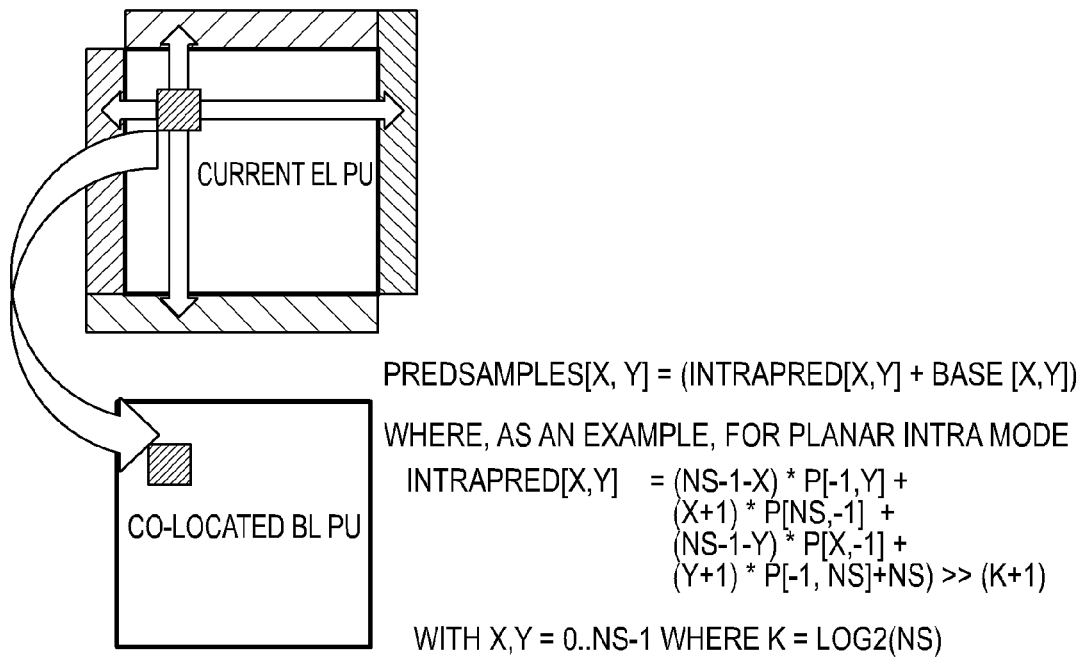
FIG. 10 is a block diagram of a weighted planar intra prediction mode implementation.

In one embodiment, such weighted prediction is also used in difference domain intra prediction. In the difference intra prediction case, the current PU as well as neighboring difference domain pixels are generated by subtracting the enhancement layer reconstructed signal with the corresponding base layer pixels. The farther the relative distance of neighboring samples (used for prediction) with respect to current prediction pixels, the bigger the prediction error. Therefore, for the samples far from the left and top block border, the method uses co-located base layer pixels (e.g., located in a corresponding position in the base layer, may also be referred to as "collocated" or "corresponding") for prediction instead of enhancement layer neighboring prediction. FIG. 10 illustrates one embodiment of planar intra prediction mode implementation for difference domain intra prediction. Planar intra prediction may refer to intra prediction based on a pixel's horizontal neighbors and/or vertical neighbors.

Figure 11:
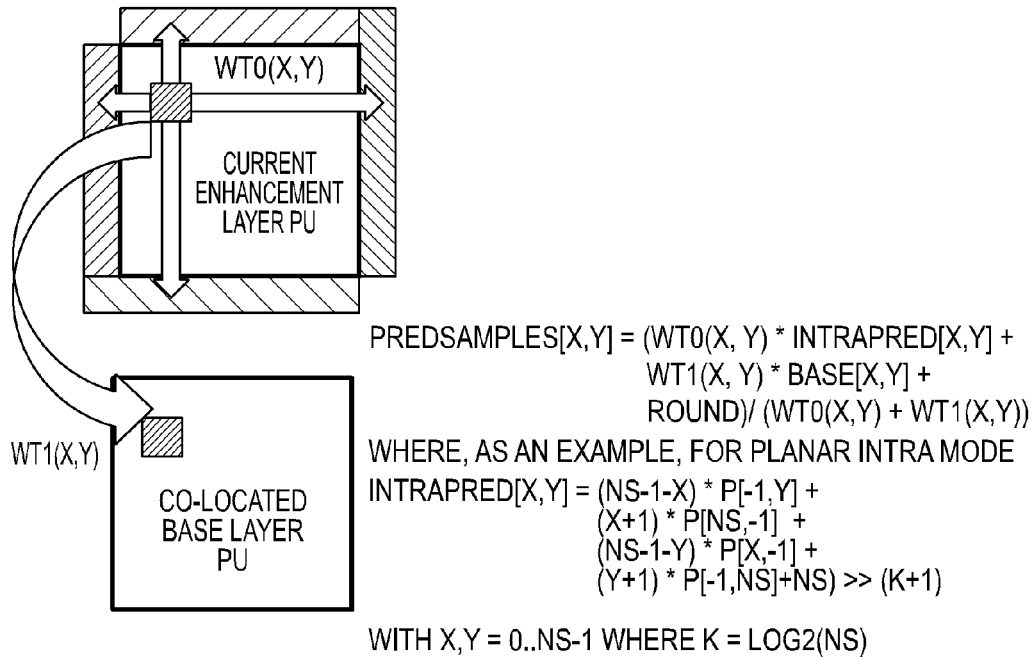
FIG. 11 is a block diagram of another embodiment of a weighted planar intra prediction mode implementation.

FIG. 11 illustrates one embodiment of weighted planar intra prediction mode implementation for difference domain intra prediction. Weights Wt0 and Wt1 are used to determine the prediction value of the current sample. In one embodiment, each weight can be between or equal to 0 and 1. In one embodiment, pixels closer to the top and/or left column of the block have larger Wt0 values, and the other pixels can have larger Wt1 values. Each weight can be coded or signaled in the signal bitstream. The mode can be applied in the difference domain or pixel domain.

Figure 12:
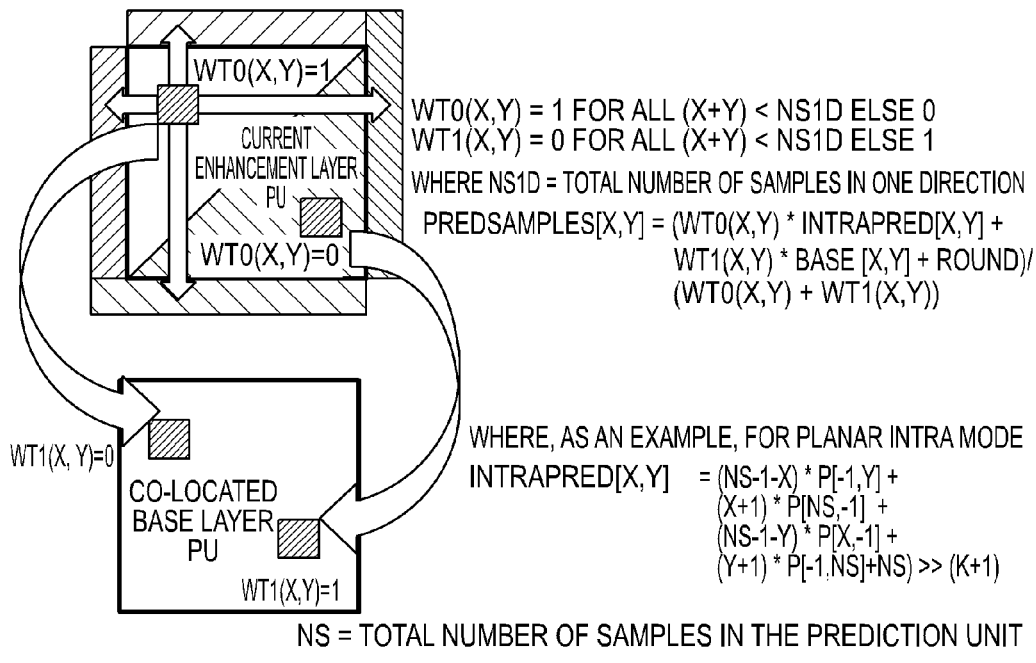
FIG. 12 is a block diagram of another embodiment of a weighted planar intra prediction mode implementation.

Another embodiment of weighted planar intra prediction is illustrated in FIG. 12. In the illustrated embodiment, weight values are determined based upon the location of the pixel within the block. For example, a diagonal boundary extending from the lower left corner to the upper right corner of the block separates the block into two regions. In other embodiments, the boundary has a curving shape. Generally, the boundary separates the left and top-most pixels of the block or unit from the remaining pixels.

In the illustrated embodiment, the pixels in one region (e.g., the region closest to the top and left edges of the unit) are all given one set of weight values (e.g., Wt0=1, Wt1=0) and the remaining pixels are given a different set of weight values (e.g., Wt0=0, Wt1=1). A boundary acts as a classifier to determine which of predetermined values will be assigned to particular pixels. In this embodiment, the weight is not coded in the bitstream, thus improving efficiency and compression. The mode can be applied in the difference or pixel domain.

Figure 13:
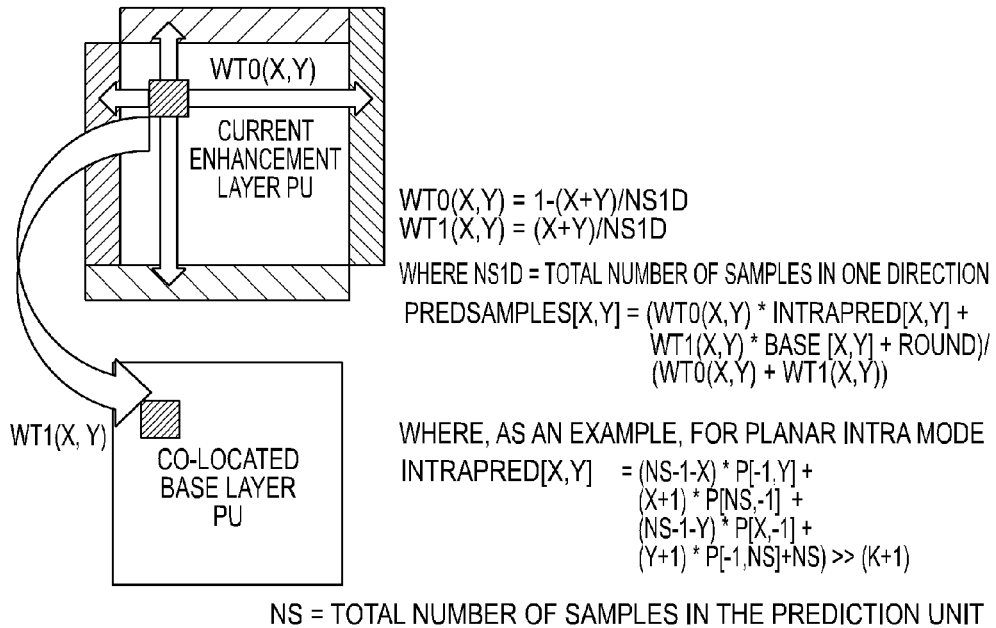
FIG. 13 is a block diagram of another embodiment of a weighted planar intra prediction mode implementation.

Another embodiment of weighted planar intra prediction is illustrated in FIG. 13. In the illustrated embodiment, weight values are determined based upon the location of the pixel within the block. The weights are calculated based upon the pixel position. For example, in one embodiment:

$$Wt0(x,y)=1-(X+Y)/nS1D;$$

$$Wt1(x,y)=(X+Y)/nS1D;$$

Where nS1D=Total number of samples in one direction;

```
predSamples[x, y] = (Wt0(x,y) * IntraPred[x,y] + Wt1(x,y) *
Base[x,y]+ Round)/ (Wt0(x,y) + Wt1(x,y))
```

Where, as an example, for Planar Intra Mode:

```
IntraPred[x,y] = (nS - 1 - x) * p[-1, y] + (x + 1) * p[nS, - 1] +
(nS - 1 - y) * p[x ,- 1] + (y + 1) * p[-1, nS] + nS) >> (k + 1)
```
nS = Total number of samples in the Prediction Unit In the illustrated embodiment, weights are calculated based upon pixel position. Therefore, the weights are not coded in the bit stream, thus improving efficiency and compression. The mode can be applied in the difference or pixel domain.

The methods and modes describe above can be applied in either the pixel domain (e.g., with pixel domain intra prediction) or in the difference domain (e.g., with difference domain intra prediction).

Figure 14:
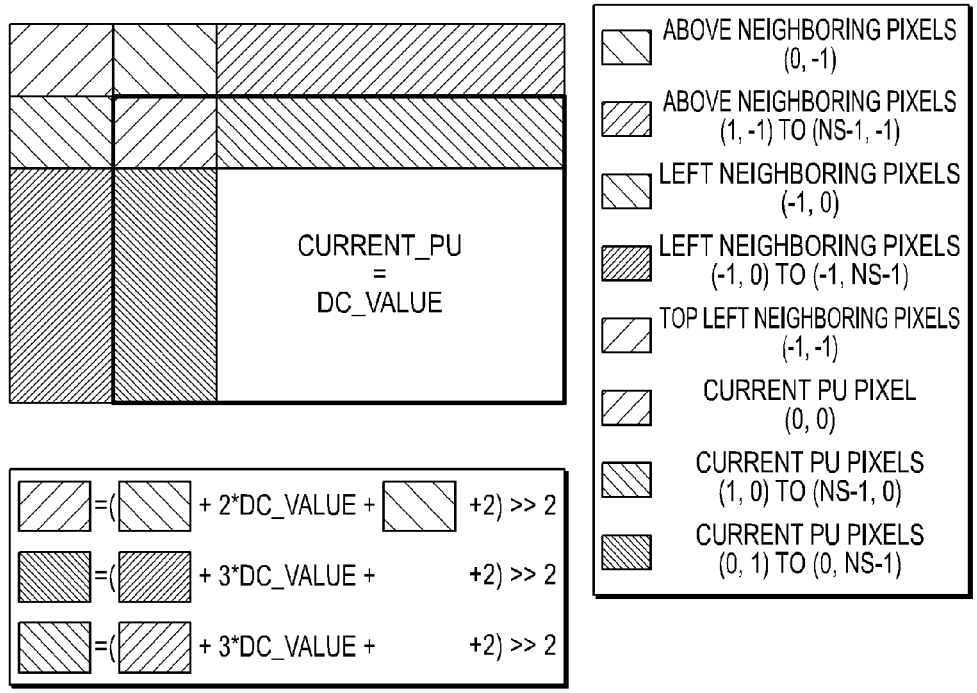
FIG. 14 is a block diagram illustrating an implementation of a DC Prediction mode.

DC Prediction Mode Based on Base Layer DC for EL Pixel Domain Intra Prediction FIG. 14 illustrates the current implementation of the DC Prediction mode according to the HEVC working draft. A DC value (e.g., the variable DC_Val) is derived based on the availability of the above and/or left neighboring pixels, as:

$$\left(\sum_{x'=0}^{nS-1} p[x', -1] + \sum_{y'=0}^{nS-1} p[-1, y'] + nS\right) >> (k+1), \text{ with}$$

$$x, y = 0 \ldots nS - 1 \text{ where } k = \text{Log2}(nS)$$

However, if a pixel (e.g., a pixel at the top or left edge of the block) does not have certain neighbors (e.g., if an above and/or left neighboring pixel is not present), the DC_Val will be set to a default value, such as 128. This can lead to inefficiencies and inaccuracies in coding.

To improve performance, accuracy and efficiency, in one embodiment, if a pixel does not have certain neighbors the variable DC_Val is derived from the co-located base layer prediction unit pixels. For example, in one embodiment, DC_Val is calculated as:

$$\left(\sum_{x=0}^{nS-1}\sum_{y=0}^{nS-1} BasePixels[x, y] + (1 << (k-1))\right) >> (k),$$

$$\text{with } x, y = 0 \ldots nS - 1 \text{ where } k = \text{Log2}(nS) << 1$$

As more samples of same time instant are available in the base layer to predict DC, the resulting prediction will be more accurate and/or efficient than the by merely considering only left and top neighboring pixels of the enhancement layer.

The DC value is sometimes determined as an average value of predetermined pixels. In one embodiment, the DC value of the base layer block is used instead of a predetermined default value when neighboring pixels used to calculate a DC value are not available, e.g., based upon pixel location.

Predicting Unavailable Neighboring Prediction Data from BL for Intra Prediction in the EL In another embodiment, a similar technique is employed during Intra Prediction in the enhancement layer. Intra Prediction values are generally derived based upon above and left neighboring pixels, as well. However, in the current implementation, if a neighboring sample is unavailable for prediction, they are either padded with a value (e.g., (1<<(BitDepth$_Y$–1)) or predicted or searched from available samples. In one embodiment, instead of padding in such manner, the unavailable pixels are replaced by the DC value of the co-located pixel's base layer prediction unit (e.g., the corresponding pixel in the base layer located at the same position as the current pixel in the enhancement layer). The co-located base layer prediction unit's DC may be determined as in same manner as discussed above. In one embodiment, the co-located base layer prediction unit's DC is determined as:

$$\left(\sum_{x=0}^{nS-1}\sum_{y=0}^{nS-1} BasePixels[x, y] + (1 << (k-1))\right) >> (k),$$

with $x, y = 0 \ldots nS - 1$ where $k = \text{Log2}(nS) << 1$ nS may refer to total number of samples in the prediction unit, for example, as defined in HEVC.

Disabling Mode Dependent Intra Smoothing for Difference Domain Intra Prediction HEVC provides Mode Dependent Intra Smoothing (MDIS) for intra prediction, including both pixel and difference domain intra prediction. The MDIS scheme determines whether a smoothing filter is applied to neighboring reconstructed samples, which are used to generate intra prediction according to the prediction unit (PU) size and the intra prediction mode. In one embodiment, MDIS is disabled for difference domain intra prediction. MDIS is applied for pixel domain intra prediction, but not during difference domain intra prediction. This may be referred to as mode dependent MDIS control.

Difference Domain Intra Prediction Signaling Only for Spatial Scalability

Scalable video coding includes both spatial scalability and SNR (e.g., quality) scalability. In case of spatial scalability, the resolution of Enhancement Layer and Base Layer are different and usually, the Enhancement layer has higher resolution than the Base layer. In case of SNR/Quality scalability the resolution of Enhancement Layer and Base Layer are the same.

In one embodiment, difference domain intra prediction is used for spatial scalability and disabled for SNR scalability case. For example, difference domain intra prediction is disabled or refrained from being used if the spatial resolution between layers is the same. When SNR scalability is present, difference domain signals generally indicate quantization loss. Therefore, the difference domain Intra Prediction may not be efficient in this case. In the current embodiment, a difference domain prediction flag is signaled only where spatial scalability is present, and it is not signaled when it is not, e.g., during SNR scalability, when current block is coded as intra prediction mode.

Figure 15:
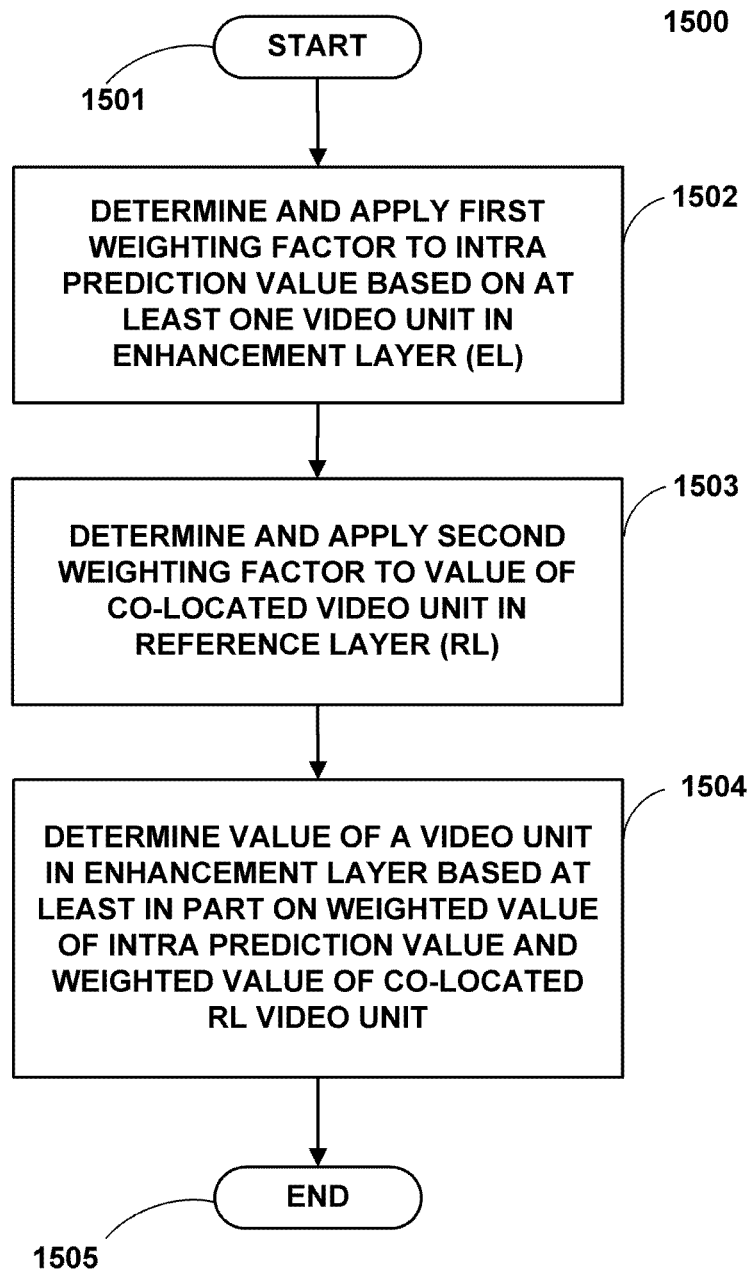
FIG. 15 is a flowchart illustrating an example method for weighted planar intra prediction according to aspects of this disclosure.

FIG. 15 is a flowchart illustrating an example method for weighted planar intra prediction according to aspects of this disclosure. The process 1500 may be performed by an encoder (e.g., the encoder as shown in FIG. 2, etc.) or a decoder (e.g., the decoder as shown in FIG. 3, etc.). The blocks of the process 1500 are described with respect to the encoder 20 in FIG. 2, but the process 1500 may be performed by other components, such as a decoder, as mentioned above. All embodiments described with respect to FIG. 15 may be implemented separately, or in combination with one another. Some of the details relating to the process 1500 are described with respect to FIGS. 10-13.

The process 1500 may be implemented to determine a value of a video unit in an enhancement layer (EL). The video unit may be positioned at a position within the EL. The video unit in the EL may be referred to as the "current EL video unit" in the description for FIG. 15 for clarity. The value of the current EL video unit may be determined based at least in part on an intra prediction value based on at least one additional video unit in the EL and a value of a co-located video unit in the reference layer (RL). The intra prediction value based on the at least one additional video unit in the EL and the value of the co-located video unit in the RL may be weighted. A video unit may be any unit of video data, and can include but is not limited to: a frame, a slice, a largest coding unit (LCU), a coding unit (CU), a block, a pixel, and a sub-pixel. The value of the video unit may be determined, e.g., by generating a prediction unit (PU) for the video unit.

The process 1500 begins at block 1501. At block 1502, the encoder 20 determines a first weighting factor and applies the first weighting factor to an intra prediction value based on at least one additional video unit in the EL. For example, the intra prediction value may be based on one or more additional video units in the EL. The additional video units may be neighboring video units of the current EL video unit. Intra prediction may be based on a particular intra prediction mode. In one embodiment, the intra prediction mode is planar intra prediction. Planar intra prediction can refer to intra prediction using one or more horizontal and/or vertical neighboring video units of the current EL video unit. Determining the first weighting factor will be described in more detail with respect to block 1502.

In one embodiment, the intra prediction value is determined based on planar intra prediction. In another embodiment, the at least one additional video unit in the enhancement layer is a horizontal neighboring video unit or a vertical neighboring video unit of the current EL video unit.

At block 1503, the encoder 20 determines a second weighting factor and applies the second weighting factor to the value of the co-located video unit in the RL. The reference layer may be a base layer, e.g., with respect to the enhancement layer. The co-located video unit in the RL may be located at a position in the RL corresponding to the position of the current EL video unit. The first and second weighting factors may be determined or selected in various ways. In one embodiment, at least one of the first and second weighting factors is between 0 and 1. In another embodiment, the first and second weighting factors may be selected from a group of predetermined values based upon the video unit position. In a certain embodiment, the first and second weighting factors may be calculated based upon the video unit position.

In yet another embodiment, the first and second weighting factors (W1, W2) may be calculated according to following equation: W1=(x+y)/width and W2=1−W1. In the equation, x corresponds to the position of the video unit along an x direction within a block of video information, y corresponds to the position of the video unit along a y direction within the block, and width corresponds to a width of the block.

The first and second weighting factors may be signaled in a bitstream. The first and second weighting factors may not be signaled in a bitstream. The first and second weighting factors may be received in a bitstream, or at least partially derived from information in a bitstream.

At block 1504, the encoder 20 determines the value of the current EL video unit based at least in part on the weighted value of the intra prediction value based on the at least one additional EL video unit and the weighted value of the co-located RL video unit. In one embodiment, the value of the video unit may be determined by generating a prediction unit (PU) for the video unit. The process 1500 ends at block 1505.

Figure 16:
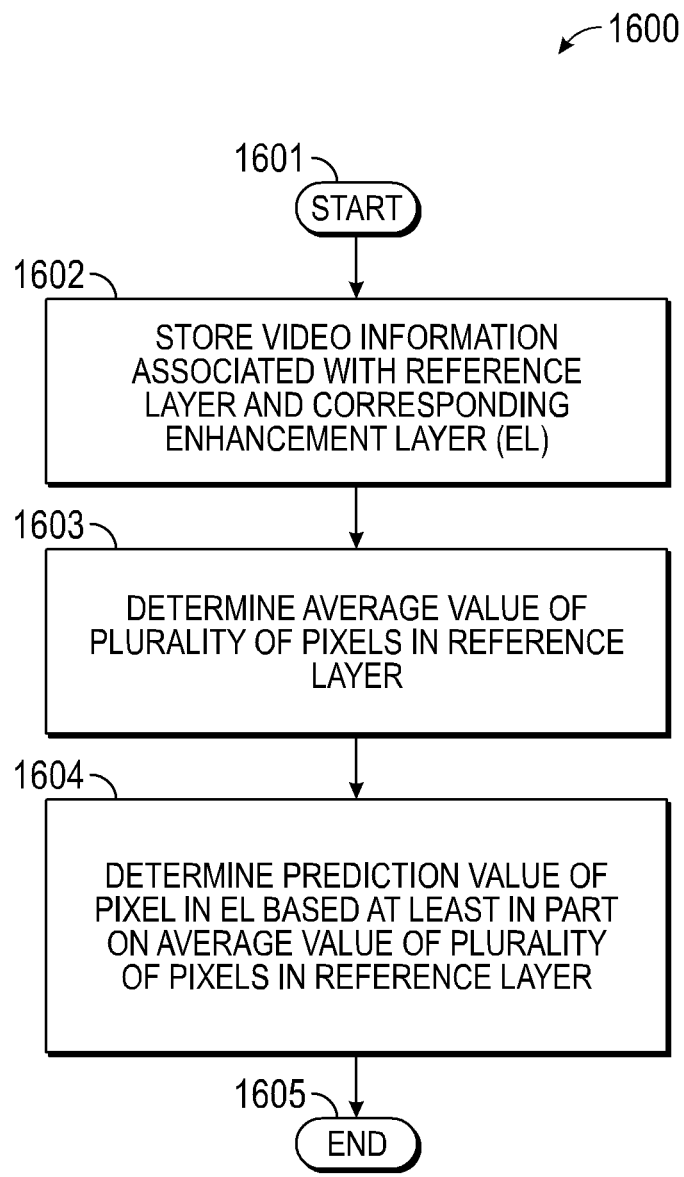
FIG. 16 is a flowchart illustrating an example method for weighted planar intra prediction according to aspects of this disclosure.

FIG. 16 is a flowchart a flowchart illustrating an example method for weighted planar intra prediction according to aspects of this disclosure. The process 1600 may be performed by an encoder (e.g., the encoder as shown in FIG. 2, etc.) or a decoder (e.g., the decoder as shown in FIG. 3, etc.). The blocks of the process 1600 are described with respect to the decoder 30 in FIG. 3, but the process 1600 may be performed by other components, such as a decoder, as mentioned above. All embodiments described with respect to FIG. 16 may be implemented separately, or in combination with one another. Some of the details relating to the process 1600 are described with respect to FIG. 14.

The process 1600 may be implemented to determine a prediction value of a pixel in an enhancement layer (EL). The pixel in the EL may be referred to as the "current EL pixel" in the description for FIG. 16 for clarity. A video unit may be any unit of video data, and can include but is not limited to: a frame, a slice, a largest coding unit (LCU), a coding unit (CU), a block, a pixel, and a sub-pixel. The value of the video unit may be determined, e.g., by generating a prediction unit (PU) for the video unit.

The process 1600 begins at block 1601. At block 1602, the decoder 30 stores video information associated with a reference layer and a corresponding enhancement layer (EL). The reference layer may be a base layer. At block 1603, the decoder 30 determines an average value of a plurality of pixels in the reference layer. For example, the decoder 30 may perform DC intra prediction for the current EL pixel. DC intra prediction is generally calculated based on an average value of neighboring pixels of the current EL pixel. In some embodiment, the DC prediction value may be determined according to the following equation as described with respect to FIG. 14:

$$\left(\sum_{x=0}^{nS-1}\sum_{y=0}^{nS-1} BasePixels[x, y] + (1 << (k-1))\right) >> (k),$$

with $x, y = 0 \ldots nS-1$ where $k = \text{Log2}(nS) << 1$

In one embodiment, the decoder 30 determines the prediction value of the current EL pixel based at least in part on an average value of a plurality of pixels in the reference layer when the current EL pixel does not have at least one neighboring video unit in the enhancement layer. In one embodiment, the decoder 30 determines the prediction value of the current EL pixel based at least in part on an average value of a plurality of pixels in the reference layer when the current EL pixel is positioned within a block having a left and right edge, and the current EL pixel is positioned along at least one of the left and right edges.

At block 1604, the decoder 30 determines a prediction value of the current EL pixel based at least in part on the average value of the plurality of pixels in the reference layer. The process 1600 ends at block 1605.

Figure 17:
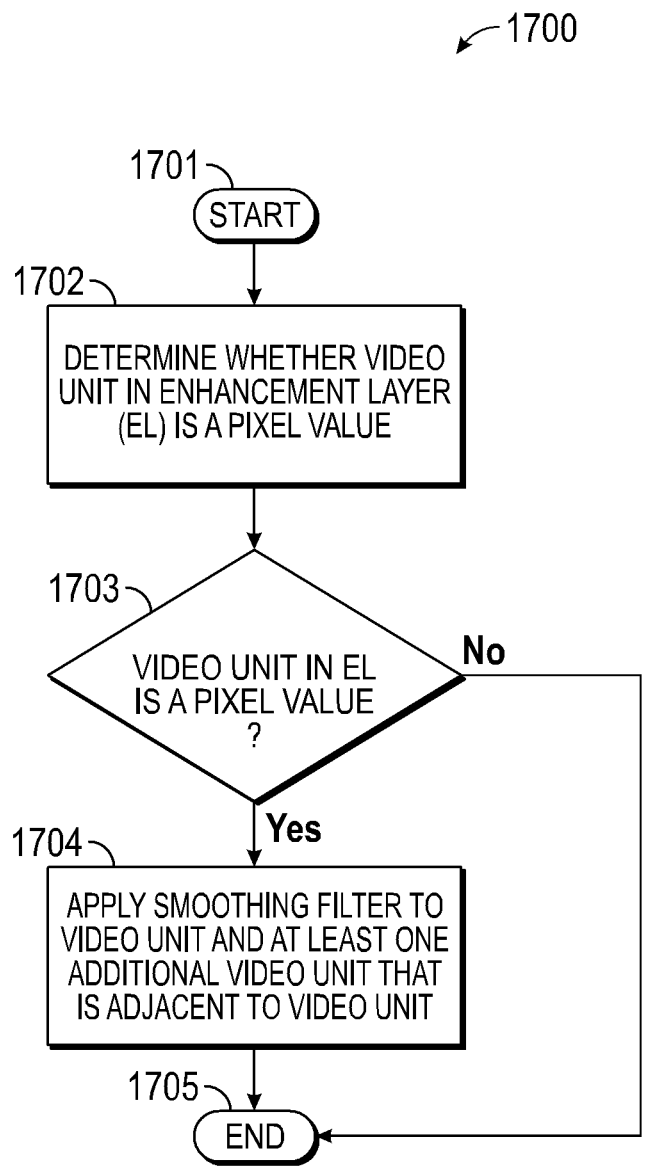
FIG. 17 is a flowchart illustrating an example method for weighted planar intra prediction according to aspects of this disclosure.

FIG. 17 is a flowchart a flowchart illustrating an example method for weighted planar intra prediction according to aspects of this disclosure. The process 1700 may be performed by an encoder (e.g., the encoder as shown in FIG. 2, etc.) or a decoder (e.g., the decoder as shown in FIG. 3, etc.). The blocks of the process 1700 are described with respect to the decoder 30 in FIG. 3, but the process 1700 may be performed by other components, such as a decoder, as mentioned above. All embodiments described with respect to FIG. 17 may be implemented separately, or in combination with one another. Some of the details relating to the process 1700 are described above.

The process 1700 may be implemented to apply a smoothing filter to a video unit in an enhancement layer. The video unit in the EL may be referred to as the "current video unit in the EL" or "current video unit" in the description for FIG. 17 for clarity. A video unit may be any unit of video data, and can include but is not limited to: a frame, a slice, a largest coding unit (LCU), a coding unit (CU), a block, a pixel, and a sub-pixel. The value of the video unit may be determined, e.g., by generating a prediction unit (PU) for the video unit.

The process 1700 begins at block 1701. At block 1702, the decoder 30 determines whether the current video unit in the EL is a pixel value. For example, the current video unit may be a video unit in the pixel domain. At block 1703, if the current video unit is a pixel value, the decoder 30 applies a smoothing filter to the current video unit and at least one additional video unit that is adjacent to the current video unit, at block 1704. If the current video unit is not a pixel value, the process 1700 may end at block 1705.

In one embodiment, if the current video unit is not a pixel value, the decoder 30 refrains from applying a smoothing filter to the current video unit and the at least one additional video unit that is adjacent to the current video unit. For example, the current video unit may be a video unit in the difference domain. The difference domain may refer to a difference video layer formed by subtracting the base layer video units from the enhancement layer video units, or vice versa.

Figure 18:
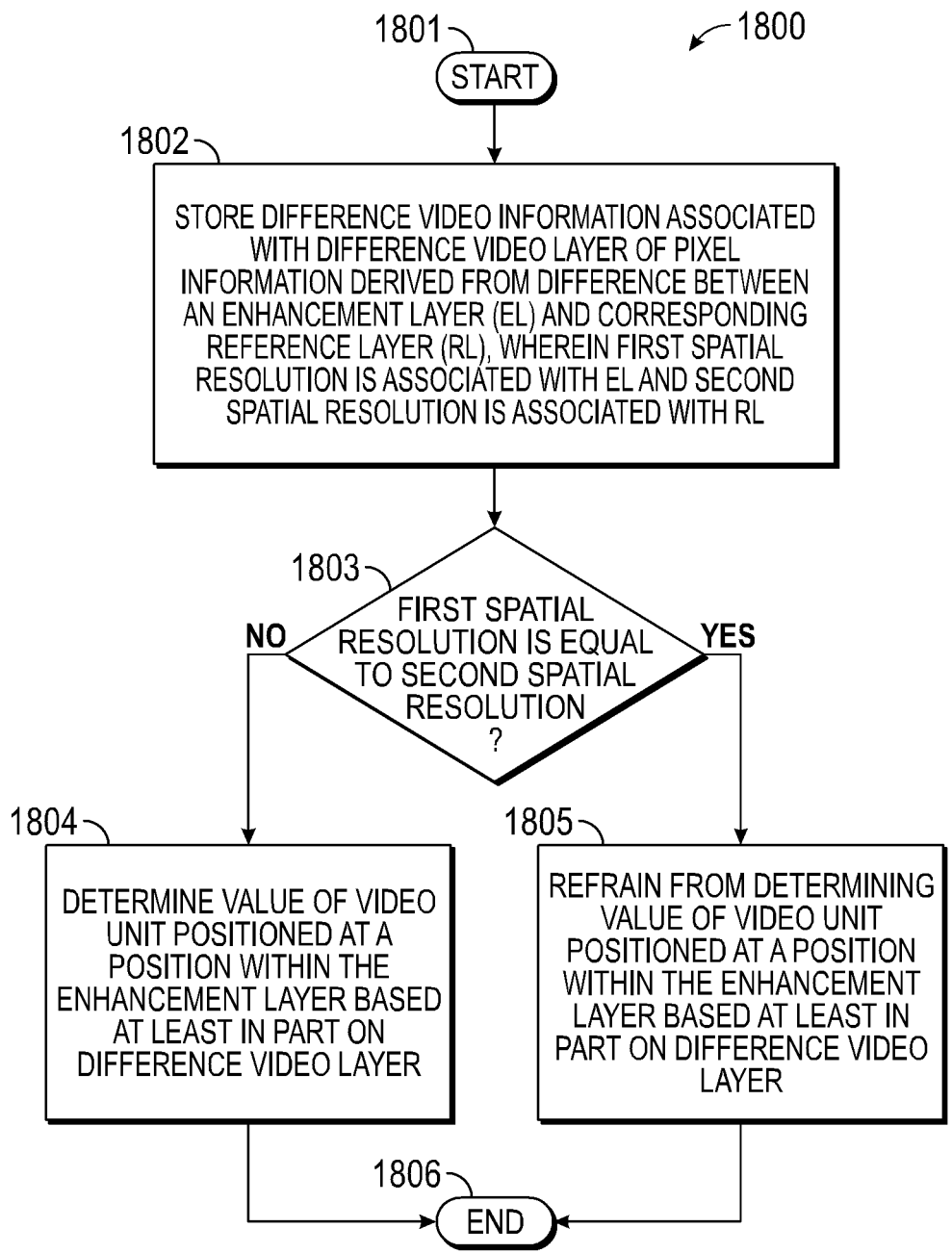
FIG. 18 is a flowchart illustrating an example method for weighted planar intra prediction according to aspects of this disclosure.

FIG. 18 is a flowchart a flowchart illustrating an example method for weighted planar intra prediction according to aspects of this disclosure. The process 1800 may be performed by an encoder (e.g., the encoder as shown in FIG. 2, etc.) or a decoder (e.g., the decoder as shown in FIG. 3, etc.). The blocks of the process 1800 are described with respect to the encoder 20 in FIG. 2, but the process 1800 may be performed by other components, such as a decoder, as mentioned above. All embodiments described with respect to FIG. 18 may be implemented separately, or in combination with one another. Some of the details relating to the process 1800 are described above.

The process 1800 may be implemented to determine a value of a video unit positioned at a position within an enhancement layer. The video unit positioned at a position within the EL may be referred to as the "current EL video unit" in the description for FIG. 18 for clarity. A video unit may be any unit of video data, and can include but is not limited to: a frame, a slice, a largest coding unit (LCU), a coding unit (CU), a block, a pixel, and a sub-pixel. The value of the video unit may be determined, e.g., by generating a prediction unit (PU) for the video unit.

The process 1800 begins at block 1801. At block 1802, the encoder 20 stores difference video information associated with a difference video layer of pixel information. The difference video layer may be derived from a difference between an enhancement layer and a corresponding reference layer. A first spatial resolution may be associated with the enhancement layer, and a second spatial resolution may be associated with the reference layer.

At block 1803, if the first spatial resolution is not equal to the second spatial resolution, the encoder 20 determines a value of a video unit positioned at a position within the enhancement layer based at least in part on the difference video layer, at block 1804. For example, the first spatial resolution and the second spatial resolution are different for spatial scalability in SVC. In case of spatial scalability, intra prediction may be performed in difference domain (e.g., based on the difference video layer). The process ends at block 1806.

At block 1803, if the first spatial resolution is equal to the second spatial resolution, the encoder 20 refrains from determining the value of the video unit based at least in part on the difference video layer, at block 1805. For example, the first spatial resolution and the second spatial resolution may be equal for signal-to-noise ratio (SNR) scalability (e.g., quality) in SVC. In case of SNR scalability, intra prediction in difference domain (e.g., based on the difference video layer) may be disabled because difference domain signals generally indicate quantization loss when SNR scalability is present. In one embodiment, the encoder 20 may signal a difference domain prediction flag in cases of spatial scalability, but not in cases of SNR scalability. The process 1800 ends at block 1806.

Intra Planar Mode Prediction

Figure 19:
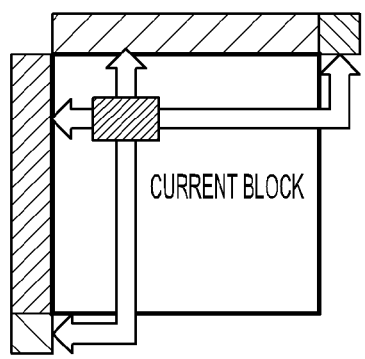
FIG. 19 illustrates an example of planar intra prediction mode

FIG. 19 illustrates an example of planar intra prediction mode. As explained above, planar mode is one of the intra prediction modes in HEVC. Planar mode is described for illustrative purposes, but the techniques described herein can be extended to all intra prediction modes. In the planar mode, the prediction samples may be derived based on the left, top, top right, and bottom left neighboring samples as shown in FIG. 19. The neighboring samples may be fully reconstructed samples from the adjacent left, top, top right, and bottom left prediction units. If the samples are not available, the HEVC draft may define a set of rules to estimate unavailable samples from the available samples. In addition, right and bottom samples may not available for prediction due to raster order coding followed in HEVC. In SVC extension, there can be multiple of layers of video data, and intra prediction may be performed in various ways. Some examples are described below.

Figure 20:
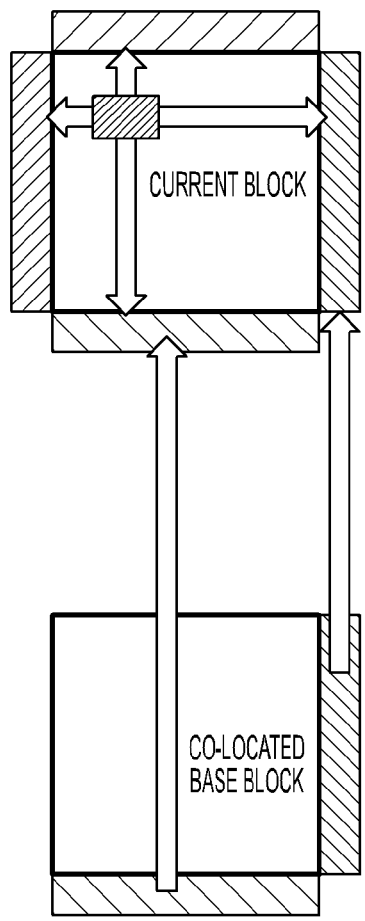
FIG. 20 illustrates one embodiment of planar mode intra prediction extension for scalable video coding.

Intra Prediction Improvements for Enhancement Layers Using a Combination of Base and Enhancement Layer Prediction Samples FIG. 20 illustrates one embodiment of planar mode intra prediction extension for scalable video coding. In the multi-loop decoding scenario, enhancement layer can use more samples from the base layer to improve prediction. HEVC allows multi-loop decoding for SVC, in which an SVC layer may be decoded using multiple motion compensation loops. For example, the base layer is fully decoded first, and then the enhancement layer is decoded. The additional samples could be from the co-located base layer block or neighboring samples of the co-located base layer block. For example, the right and bottom samples may not available in the enhancement layer, and the planar mode could be extended to use right and bottom samples from the co-located base layer neighboring samples as shown in FIG. 20.

Various embodiments are described below for enhancement layer intra prediction using a combination of base and enhancement layer prediction samples. All embodiments described below may be implemented separately, or in combination with one another.

Embodiment 1: Intra prediction at the enhancement layer may use additional co-located samples from the base layer or co-located neighboring samples from the base layer for prediction.

Embodiment 2: Intra prediction at the enhancement layer may replace some or all of the current block's neighboring samples at enhancement layer with some or all of co-located samples or co-located neighboring samples from the base layer.

Embodiment 3: Intra prediction at the enhancement layer may use a combination of enhancement layer samples and co-located samples from the base layer.

Figure 21:
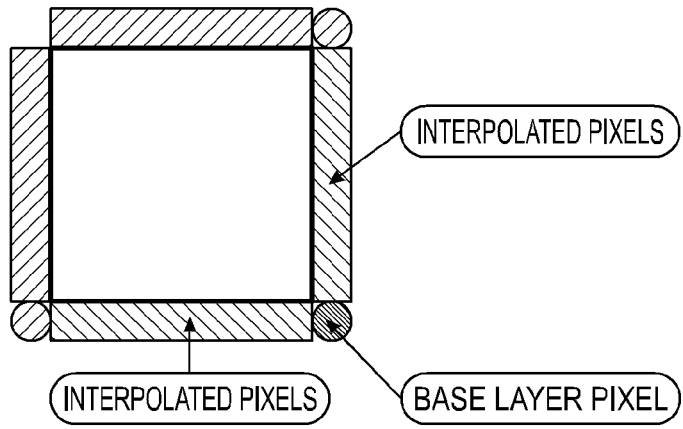
FIG. 21 illustrates one embodiment of enhancement layer intra prediction using a combination of base and enhancement layer prediction samples.

Embodiment 4: Alternatively and/or additionally, only one base layer bottom right pixel outside of the current block may be used. FIG. 21 illustrates one embodiment of enhancement layer intra prediction using a combination of base and enhancement layer prediction samples. The pixels in the right column and the bottom row outside of the predicted block used for planar prediction can be obtained as linear or non-linear interpolation between outer bottom right base layer pixel (circle in bottom-right corner in FIG. 21) and outer top right enhancement layer pixel (circle in upper-right corner in FIG. 21) and outer bottom left enhancement layer pixel (circle in bottom-left corner in FIG. 21) correspondingly as shown in FIG. 21.

1. Layer Dependent Coding Scan Pattern

Mode dependent adaptive scan order was proposed in HEVC WD8. In mode dependent adaptive scan order, scanning pattern can be chosen among diagonal, horizontal, and vertical based on the intra prediction mode for intra residual coefficients. Intra residual coefficients may refer to quantized coefficients that can be generated as a result of intra prediction. They may also be referred to as quantized coefficients. This can lead to improved rate-distortion tradeoff. From decoder perspective, the scanning pattern can be determined as soon as the intra prediction mode is decoded, and this scanning pattern can be used subsequently while decoding the coefficients.

This disclosure incorporates herein by reference the entire disclosures of U.S. Provisional Application No. 61/696,098, filed Aug. 31, 2012, and U.S. Provisional Application No. 61/707,145, filed Sep. 28, 2012. In at least a portion of said provisional application(s), it is proposed that enhancement layer can use co-located base layer intra prediction mode as one of the MPM candidates. This can introduce parsing dependency at the enhancement layer, e.g., dependency that BL mode should be available while decoding the EL intra prediction mode. In certain embodiments, this may not be desirable 1) when a base layer bitstream is lost or corrupted, or 2) for hardware implementations where parsing dependency across layers may not be a priority.

Various embodiments are described below for adaptively selecting coding scan patterns based on information relating to layers. All embodiments described below may be implemented separately, or in combination with one another.

Embodiment 1: The coding scan pattern may be adaptively selected based on the layer ID. For example, a layer ID may be associated with each layer in SVC. A layer ID may be the identifier of a layer. The enhancement layer can use a different coding scan pattern compared to the base layer. For example, the EL can use a fixed scanning pattern. In one example, one scan pattern can be used for all intra prediction modes in the EL whether or not the base layer intra mode prediction is enabled for that sequence or frame. This can avoid parsing dependency at the EL parsing stage.

Embodiment 2: The coding scan pattern may be adaptively selected based on whether a base-layer picture is available as inter-layer prediction for the current picture. The enhancement layer can use a different coding scan pattern compared to the base layer. For example, the EL can use a fixed scanning pattern. In one example, one scan pattern can be used for all intra prediction modes in the EL whether or not the base layer intra mode prediction is enabled for that sequence or frame. This can avoid parsing dependency at the EL parsing stage.

Embodiment 3: The coding scan pattern may be adaptively selected based on whether or not the base layer intra mode prediction is enabled for the current picture. The enhancement layer can use a different coding scan pattern compared to the base layer. For example, the EL can use a fixed scanning pattern. In one example, one scan pattern can be used for all intra prediction modes in the EL whether or not the base layer intra mode prediction is enabled for that sequence or frame. This can avoid parsing dependency at the EL parsing stage.

Embodiment 4: In Embodiments 1, 2, and 3, the fixed scanning pattern for enhancement layer may be a diagonal scan pattern for all intra prediction modes in the EL whether or not the base layer intra mode prediction is enabled for that sequence and/or frame.

2. Simplified Difference Domain Intra Prediction

Figure 22:
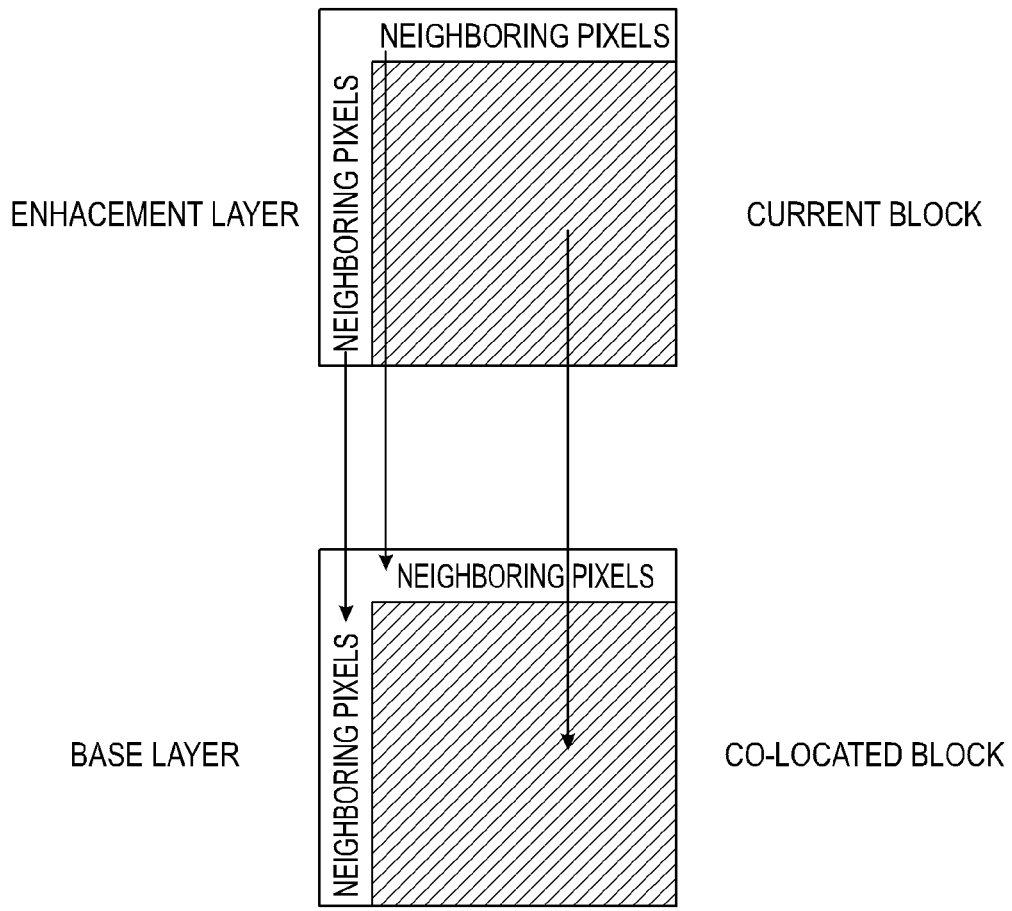
FIG. 22 illustrates one embodiment of a proposed intra residual prediction mode in difference domain intra prediction.

Difference domain intra prediction has been proposed in JCT-VC-K0036. Details relating to JCT-VC-K0036 may be found at http://phenix.int-evry.fr/jct/, which is incorporated by reference herein. FIG. 22 illustrates one embodiment of the proposed intra residual prediction mode. In the proposed intra residual prediction mode, the difference between the pixels of current neighbors and the pixels of co-located BL neighbors are used to generate a difference prediction based on the intra prediction mode. The generated difference prediction signal is added to the co-located BL block signal to form the final prediction. The number of intra prediction modes for the difference signal was proposed to be same as that of non-difference and/or intra signal. The intra residual prediction mode is indicated by, for example, a flag intra_resi_pred_flag at CU level.

The difference domain signal may comprise high frequency components, and various intra prediction modes may not lead to good prediction results as for the non-difference domain signal (e.g., pixel domain signal). Accordingly, the techniques described in this disclosure can simplify intra prediction in the difference domain to lead to better prediction results. Some embodiments are illustrated below. All embodiments described below may be implemented separately, or in combination with one another. In this disclosure, normal intra prediction may refer to intra prediction in the non-difference domain, such as the pixel domain, etc.

Embodiment 1: A different set of and/or number of intra prediction modes is used in the difference domain from normal intra prediction.

Embodiment 2: For Embodiment 1, the number of intra prediction modes can be reduced in the difference domain. For instance, only two modes can be used for the difference domain. For example, the two modes may be 1) horizontal and vertical, 2) planar and vertical, or 3) planar and horizontal. Selection of two modes is not limited to the above modes or combinations, and any of the 35 modes defined in intra prediction can be selected. The selection can be based on EL and/or BL info data of the current frame, or temporal frames data from EL and/or BL. Reducing the number of intra prediction modes can reduce signaling cost and may lead to limited loss of prediction quality, for example, due to not using other modes. The data can include modes, reconstructed current or neighboring pixels, etc.

Embodiment 3: For Embodiments 1-2, the chosen best mode can be signaled to the decoder using a flag or index at CU or PU level. This flag or index can be context coded, and the context selection may or may not be based on the neighboring CU or PU modes, EL pixels, and/or BL pixels. The signaling of the flag may be done after signaling the residual prediction flag.

Embodiment 4: The number of intra prediction modes in the difference domain can be reduced to only three modes. These three modes may be the modes derived as a part of the Most Probable Intra Mode (MPM) derivation process.

Embodiment 5: For Embodiment 4, the mpm_prediction flag may be signaled as mode dependent. In this embodiment, the mpm_prediction flag is not signaled, and the decoder derives the information from the mode (e.g., the difference domain intra mode or normal intra mode). The information may include where the MPM list is used for intra mode selection, number, number of modes used in difference domain intra prediction, etc.

Embodiment 6: Embodiments 1-6 can be extended to normal intra prediction in a similar manner.

Embodiment 7: Intra prediction mode number is dependent on the layer ID. For example, the base layer and the enhancement layer use different set of and/or number of intra prediction modes.

Embodiment 8: For Embodiment 7, a fewer number of intra prediction modes is used in enhancement layer coding than in base layer coding.

3. Using DC from Neighboring Pixels for DC Adjacent Method of JCTVC-K0032 and JCTVC-K0040

A DC adjustment method has been proposed in JCTVC-K0032 and JCTVC-K0040. Details relating to JCTVC-K0032 and JCTVC-K0040 may be found at http://phenix.int-evry.fr/jct/, which is incorporated by reference herein. In this method, a DC adjustment is applied for intra prediction blocks of size 4×4, 8×8, or larger in order to adjust the enhancement layer intra predicted sample values in a way that the block's DC is made to match that of the corresponding base layer block. The process can be represented as follows:

$$P(x,y)=P'(x,y)+dc\_delta \quad \text{(Equation 1)}$$

where

P(x,y) denotes the final predicted sample in the enhancement layer picture;

P'(x,y) denotes a predicted enhancement layer sample after HEVC (version 1) intra prediction process; and $dc\_delta=(DC$ value of co-located base layer prediction blocks$)-(DC$ value of $P'(x,y)$blocks$)$.

The techniques described in this disclosure can use neighboring reconstructed pixels instead of the predicted enhancement layer sample after the HEVC intra prediction process. This can remove the delay introduced by methods proposed in JCTVC-K0032 and JCTVC-K0040 and also simplify the DC computation due to the reduced number of pixel set. Various embodiments are described below. All embodiments described below may be implemented separately, or in combination with one another.

Embodiment 1: The DC value derived from neighboring pixels can be used to compute dc_delta. For example, in Equation 1 above, dc_delta can be determined as follows:

$dc\_delta=(DC$ value of co-located base layer prediction blocks$)-(DC$ value *of EL* neighboring pixels$)$.

Embodiment 2: For Embodiment 1, the DC value derived from all of the EL neighboring pixels can be used to compute dc_delta.

Embodiment 3: For Embodiment 1, the DC value derived from some of the EL neighboring pixels based on the intra prediction direction can be used to compute dc_delta. In one example, for vertical prediction mode, only the above neighboring samples can be used for computing the DC value. In another example, for horizontal mode, only the left neighboring samples can be used for computing the DC value.

Embodiment 4: For Embodiment 1, the DC value derived from only those EL neighboring pixels that are being used for that particular intra prediction mode can be used to compute dc_delta. In one example, for vertical prediction mode, only the above neighboring samples are used for computing the DC value.

4. Intra Prediction Direction Dependent 1-D Transform for Difference Domain Residues As explained above, an exemplary video coder may use coding techniques, such as motion prediction, transform, quantization, entropy coding, etc. These techniques can generally be applied to rectangular blocks and/or regions of a frame called coding units.

The prediction residues of the blocks can generally be transformed using techniques like DCT and/or DST ("discrete cosine transform" or "discrete sine transform") to de-correlate signals so that the outputs can be efficiently coded using techniques such as scalar quantization. In HEVC, 2-D DCT and/or DST transform may be defined to transform a 2D block at a time.

As explained above, the characteristics of difference domain block residues may be different from other block types, and 2-D DCT and/or DST may not be a great choice in terms of coding efficiency. Accordingly, the techniques described in this disclosure can apply alternative transforms for difference domain residue coding.

Various embodiments for intra prediction direction dependent directional transform are described below. All embodiments described below may be implemented separately, or in combination with one another.

Embodiment 1: In a video encoder, a primary transform (e.g., 2-D DCT and/or DST) can be used for all block coding modes. For different modes (e.g., inter coded, intra coded, lossless coded, etc.), 2-D DCT or DST may be used for all the blocks, and the selection of 2-D DCT or DST may depend on the mode or may be signaled. According to this embodiment, a transform different from the primary transform can be used for the difference domain based on the intra prediction direction.

Figure 23:
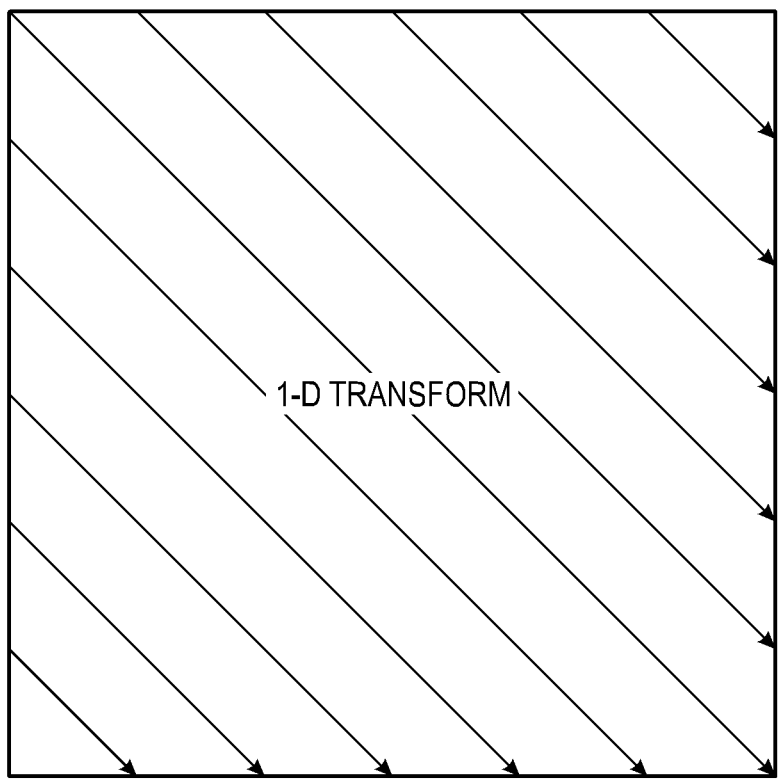
FIG. 23 illustrates an example 1-D directional transform for 45 degree intra prediction direction.

Embodiment 2: The transform may be 1-D DCT or DST along the intra prediction direction. For example, for 45-degree intra angular prediction, the transform may be as illustrated in FIG. 23.

Embodiment 3: For the difference domain residues, the transform may be 1-D DCT, DST, KLT, or any other 1-D transform along the prediction direction. The selection of the transform can be adaptive, and can be signaled or derived. For example, the selection of transform can be signaled at frame, slice, CU, PU level, etc. The selection of transform can also be derived from the EL or BL information, which may include mode information, QP information, pixel information, prediction direction information, etc. In some examples, the selection may be predefined and known to the encoder and the decoder.

Embodiment 4: Embodiments 1, 2, 3 can also be extended to non-difference domain intra residues.

5. Mode or Layer Dependent Enabling of Contouring Modifications of JCT-VC K0139

JCT-VC K0139 proposes a solution to replace the intra smoothing filter with a bi-linear interpolation of the reference samples in the 32×32 intra prediction to avoid contouring artifacts. When performing block-based video coding, due to quantization, several types of artifacts can appear, including contouring artifacts. When smooth regions are quantized, the resulting visual effect can be an abrupt and isolated step or "contour" in the displayed image, where pixels on one side of the step may be assigned to one quantization level and pixels on the other side may be assigned to a neighboring level. This effect may be referred to as "contouring." In the base layer, contouring artifacts may occur due to the propagation of blocking artifacts from the reference samples during the process of generating the intra predicted sample array predSamples in the 32×32 blocks.

The prediction and the residue characteristics at the enhancement layer may be very different from the base layer. Therefore, the proposed technique in JCT-VC K0139 may not be effective in reducing contouring artifacts and may introduce different kinds of artifacts. An artifact may refer to an alteration in video and/or image data introduced in a compression process by an involved technique.

Various embodiments for mode or layer dependent enabling of contouring modifications are described below. All embodiments described below may be implemented separately, or in combination with one another.

Embodiment 1: The proposed modification of JCT-VC K0139 for the base layer may be layer dependent and may be switched off at the enhancement layer.

Embodiment 2: The proposed modification of JCT-VC K0139 for the base layer may be mode dependent and may be switched off for all or few of the enhancement layer newly added modes, such as different domain intra prediction. The proposed modification can still be applied to normal intra prediction for enhancement layer coding.

6. Intra Base Prediction Infer Mode

In one embodiment, the co-located base layer intra prediction mode may be included as one of the candidates in the MPM list. This can provide gains since significant correlation may exist between the mode distribution of the EL and the BL. If there is a significant correlation between the EL mode and the BL mode, it may be better to give more weighting to the base layer mode. One example way of giving more weight can be prioritizing the mode (e.g., to reduce the signaling cost for this mode). Prioritizing may refer to pushing the mode up in the MPM list such that signaling the mode has a lower bit cost.

Various embodiments for inferring the base layer intra prediction mode are described below. For example, the current video unit in the EL can infer the base layer intra prediction mode from the co-located video unit in the BL. The intra prediction mode for the current CU can be inferred from the base layer information. All embodiments described below may be implemented separately, or in combination with one another.

Embodiment 1: A flag may be signaled at frame, slice, CU, and/or PU level to indicate that the base layer intra prediction mode is used for intra prediction. The mode can be predefined and/or available to both the encoder and the decoder since the mode information may not be signaled.

Embodiment 2: Embodiment 1 may be extended to other modes, such as difference domain prediction, etc.

Embodiment 3: Embodiment 2 may be applied only to either luma or chroma components.

Embodiment 4: The flag may be context coded. The context modeling may use information from neighboring EL blocks to derive the context. The context modeling may also be simplified to not use any information from neighboring EL or BL blocks.

7. Pixel Component Dependent Difference Domain Intra Prediction

Difference domain intra prediction can provide different compression efficiency for a luma component and a chroma component. For a good trade-off between complexity and compression performance, it may be beneficial in some applications to have the flexibility of applying difference domain intra prediction for luma components only, chroma components only, or both.

Various embodiments for pixel component dependent difference domain intra prediction are described below. All embodiments described below may be implemented separately, or in combination with one another.

Embodiment 1: The difference domain intra prediction may be applied only to either a luma component or a chroma component. For a component that does not use difference domain intra prediction, normal intra prediction may be used for that component.

Embodiment 2: The selection to apply difference domain prediction only to a luma or a chroma component can be adaptive. The selection can be signaled at frame, slice, CU, PU level, etc. Or the selection can be derived from the EL or BL information, which may include mode information, QP information, pixel information, prediction direction information, etc. In some examples, the selection may be predefined and known to the encoder and the decoder.

Figure 24A:
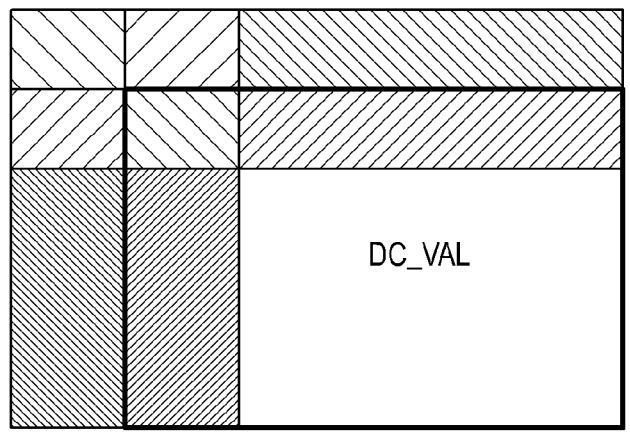
FIG. 24A illustrates one embodiment of filtering for intra DC prediction.
Figure 24B:
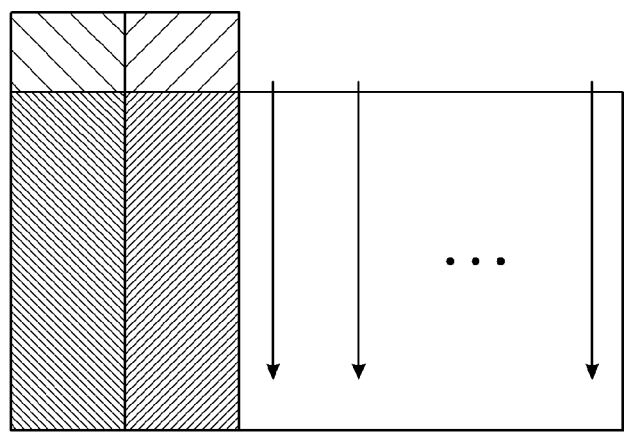
FIG. 24B illustrates one embodiment of filtering for vertical and/or horizontal prediction modes.

8. Mode or Layer Dependent Intra Filtering for DC, Vertical, and Horizontal Prediction Filtering for DC, vertical, and/or horizontal prediction was proposed in HEVC WD8. The process of filtering is shown in FIGS. 24A and 24B. FIG. 24A illustrates one embodiment of filtering for intra DC prediction. FIG. 24B illustrates one embodiment of filtering for vertical and/or horizontal prediction modes. The prediction and the residue characteristics at the enhancement layer may be very different from the base layer. Therefore, the proposed technique in HEVC WD8 may not be effective and may introduce different kinds of artifacts.

Accordingly, the techniques described in this disclosure may modify the filtering for DC, vertical, and/or horizontal predictions to be mode dependent or layer dependent. Various embodiments for mode or layer dependent intra filtering for DC, vertical, and horizontal predictions are described below. All embodiments described below may be implemented separately, or in combination with one another.

Embodiment 1: The proposed filtering for DC prediction modification of HEVC WD8 for the base layer may be layer dependent and may be switched off at the enhancement layer. The DC filtering may also be layer dependent for the enhancement layer.

Embodiment 2: The proposed filtering for DC prediction modification of HEVC WD8 for the base layer may be mode dependent and may be switched off for all or few of the enhancement layer newly added modes, such as different domain intra prediction. The proposed modification can still be applied to normal intra prediction for enhancement layer coding.

Embodiment 3: The proposed filtering for vertical prediction modification of HEVC WD8 for the base layer may be layer dependent and may be switched off at the enhancement layer.

Embodiment 4: The proposed filtering for vertical prediction modification of HEVC WD8 for the base layer may be mode dependent and may be switched off for all or few of the enhancement layer newly added modes, such as different domain intra prediction. The proposed modification can still be applied to normal intra prediction for enhancement layer coding.

Embodiment 5: The proposed filtering for horizontal prediction modification of HEVC WD8 for the base layer may be layer dependent and may be switched off at the enhancement layer.

Embodiment 6: The proposed filtering for horizontal prediction modification of HEVC WD8 for the base layer may be mode dependent and may be switched off for all or few of the enhancement layer newly added modes, such as different domain intra prediction. The proposed modification can still be applied to normal intra prediction for enhancement layer coding.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. An apparatus configured to code video information, the apparatus comprising:
   a memory configured to store video information associated with a reference layer and a corresponding enhancement layer; and
   a hardware processor in communication with the memory, the processor configured to:
      determine a value of a video unit positioned at a position within the enhancement layer from (1) an intra prediction value weighted by a first weighting factor, wherein the intra prediction value is determined based on at least one additional video unit in the enhancement layer, and (2) a value of a co-located video unit in the reference layer weighted by a second weighting factor, wherein the co-located video unit is located at a position in the reference layer corresponding to the position of the video unit in the enhancement layer,
      wherein the first and second weighting factors are calculated based upon the position of the video unit, and wherein the second weighting factor is proportional to a two-dimensional pixel position associated with the video unit and weighted by the total number of pixel samples in one dimension of the two dimensions, and wherein the first weighting factor is determined from the second weighting factor.

2. The apparatus of claim 1, wherein the intra prediction value is determined based on a planar intra prediction mode.

3. The apparatus of claim 1, wherein the at least one additional video unit in the enhancement layer is a horizontal neighboring video unit or a vertical neighboring video unit of the video unit positioned at the position within the enhancement layer.

4. The apparatus of claim 1, wherein at least one of the first and second weighting factors is between 0 and 1.

5. The apparatus of claim 1, wherein the first and second weighting factors are signaled in a video bitstream.

6. The apparatus of claim 1, wherein the first and second weighting factors are not signaled in a video bitstream.

7. The apparatus of claim 1, wherein the first and second weighting factors are selected from a group of predetermined values based upon the position of the video unit.

8. The apparatus of claim 1, wherein the first and second weighting factors (W1, W2) are calculated as $W1=(x+y)/\text{width}$ and $W2=1-W1$, wherein x corresponds to the position of the video unit along an x direction within a block of video information, y corresponds to the position of the video unit along a y direction within the block, and width corresponds to a width of the block.

9. The apparatus of claim 1, wherein the reference layer comprises a base layer.

10. The apparatus of claim 1, wherein the intra prediction value based on the at least one additional video unit in the enhancement layer is a prediction unit.

11. The apparatus of claim 1, wherein the apparatus comprises one or more of: a desktop computer, a notebook computer, a laptop computer, a tablet computer, a set-top box, a telephone handset, a smart phone, a wireless communication device, a smart pad, a television, a camera, a display device, a digital media player, a video gaming console, or a video streaming device.

12. The apparatus of claim 1, wherein the processor is configured to determine a prediction value of a pixel in the enhancement layer (EL) based at least in part on an average value of a plurality of pixels in the reference layer.

13. The apparatus of claim 12, wherein the processor is further configured to determine the prediction value of the pixel in the EL based at least in part on an average value of a plurality of pixels in the reference layer when the pixel in the enhancement layer does not have a neighboring pixel in the enhancement layer.

14. The apparatus of claim 12, wherein the processor is further configured to determine the prediction value of the pixel in the EL based at least in part on an average value of a plurality of pixels in the reference layer when the pixel is positioned within a block having a left and right edge, and the pixel is positioned along at least one of the left and right edges.

15. The apparatus of claim 1, wherein the processor is further configured to apply a smoothing filter to the video unit and at least one additional video unit adjacent to the video unit when the video unit is a pixel value.

16. The apparatus of claim 15, the smoothing filter is not applied when the video unit is not a pixel value.

17. The apparatus of claim 1, wherein the reference layer and the enhancement layer are each associated with a layer identifier, and the processor is further configured to select a coding scan pattern adaptively based on the layer identifier.

18. The apparatus of claim 1, wherein:
the memory unit is further configured to store difference video information associated with a difference video layer of pixel information derived from a difference between the reference layer and the corresponding enhancement layer, wherein a first spatial resolution is associated with the enhancement layer and a second spatial resolution is associated with the reference layer; and
the processor is further configured to determine a value of the video unit positioned at the position within the enhancement layer based at least in part on the difference video layer when the first spatial resolution is not equal to the second spatial resolution, and the processor is further configured to not determine the value of the video unit based at least in part on the difference video layer when the first spatial resolution is equal to the second spatial resolution.

19. A method of coding video information, the method comprising:
storing video information associated with a reference layer and a corresponding enhancement layer; and
determining a value of a video unit positioned at a position within the enhancement layer from (1) an intra prediction value weighted by a first weighting factor, wherein the intra prediction value is determined based on at least one additional video unit in the enhancement layer, and (2) a value of a co-located video unit in the reference layer weighted by a second weighting factor, wherein the co-located video unit is located at a position in the reference layer corresponding to the position of the video unit in the enhancement layer,
wherein the first and second weighting factors are calculated based upon the position of the video unit, and wherein the second weighting factor is proportional to a two-dimensional pixel position associated with the video unit and weighted by the total number of pixel samples in one of the dimensions, and wherein the first weighting factor is determined from the second weighting factor.

20. The method of claim 19, wherein the intra prediction value is determined based on a planar intra prediction mode.

21. The method of claim 19, wherein the at least one additional video unit in the enhancement layer is a horizontal neighboring video unit or a vertical neighboring video unit of the video unit positioned at the position within the enhancement layer.

22. The method of claim 19, wherein at least one of the first and second weighting factors is between 0 and 1.

23. The method of claim 19, further comprising signaling the first and second weighting factors in a video bitstream.

24. The method of claim 19, further comprising deriving the first and second weighting factors based at least in part on the video information.

25. The method of claim 19, further comprising selecting the first and second weighting factors from a group of predetermined values based upon the position of the video unit.

26. The method of claim 19, further comprising calculating the first and second weighting factors (W1, W2) as W1=(x+y)/ width and W2=1−W1, wherein x corresponds to the position of the video unit along an x direction within a block of video information, y corresponds to the position of the video unit along a y direction within the block, and width corresponds to a width of the block.

27. The method of claim 19, wherein the reference layer comprises a base layer.

28. The method of claim 19, wherein the intra prediction value based on the at least one additional video unit in the enhancement layer is a prediction unit.

29. The method of claim 19, further comprising determining a prediction value of a pixel in the enhancement layer (EL) based at least in part on an average value of a plurality of pixels in the reference layer.

30. The method of claim 29, further comprising determining the prediction value of the pixel in the EL based at least in part on an average value of a plurality of pixels in the reference layer when the pixel in the enhancement layer does not have a neighboring pixel in the enhancement layer.

31. The method of claim 29, further comprising determining the prediction value of the pixel in the EL based at least in part on an average value of a plurality of pixels in the reference layer when the video unit is positioned within a block having a left and right edge, and the video unit is positioned along at least one of the left and right edges.

32. The method of claim 19, further comprising applying a smoothing filter to the video unit and at least one additional video unit adjacent to the video unit when the video unit is a pixel value.

33. The method of claim 32, wherein the smoothing filter is not applied when the video unit is not a pixel value.

34. The method of claim 19, further comprising:
storing difference video information associated with a difference video layer of pixel information derived from a difference between the reference layer and the corresponding enhancement layer, wherein a first spatial resolution is associated with the enhancement layer and a second spatial resolution is associated with the reference layer;

determining a value of the video unit positioned at the position within the enhancement layer based at least in part on the difference video layer when the first spatial resolution is not equal to the second spatial resolution; and not determining the value of the video unit based at least in part on the difference video layer when the first spatial resolution is equal to the second spatial resolution.

35. The method of claim 19, wherein the reference layer and the enhancement layer are each associated with a layer identifier, and the processor is further configured to select a coding scan pattern adaptively based on the layer identifier.

36. A non-transitory computer-readable medium storing instructions for coding video information that cause a computer processor to:

store video information associated with a reference layer and a corresponding enhancement layer; and determine a value of a video unit positioned at a position within the enhancement layer from () an intra prediction value weighted by a first weighting factor, wherein the intra prediction value is determined based on at least one additional video unit in the enhancement layer, and (2) a value of a co-located video unit in the reference layer weighted by a second weighting factor, wherein the co-located video unit is located at a position in the reference layer corresponding to the position of the video unit in the enhancement layer, wherein the first and second weighting factors are calculated based upon the position of the video unit, and wherein the second weighting factor is proportional to a two-dimensional pixel position associated with the video unit and weighted by the total number of pixel samples in one of the dimensions, and wherein the first weighting factor is determined from the second weighting factor.

37. The computer-readable medium of claim 36, wherein the intra prediction value is determined based on a planar intra prediction mode.

38. The computer-readable medium of claim 36, wherein the at least one additional video unit in the enhancement layer is a horizontal neighboring video unit or a vertical neighboring video unit of the video unit positioned at the position within the enhancement layer.

39. An apparatus for coding video information, the apparatus comprising:

means for storing video information associated with a reference layer and a corresponding enhancement layer; and means for determining a value of a video unit positioned at a position within the enhancement layer from (1) an intra prediction value weighted by a first weighting factor, wherein the intra prediction value is determined based on at least one additional video unit in the enhancement layer, and (2) a value of a co-located video unit in the reference layer weighted by a second weighting factor, wherein the co-located video unit is located at a position in the reference layer corresponding to the position of the video unit in the enhancement layer, wherein the first and second weighting factors are calculated based upon the position of the video unit, and wherein the second weighting factor is proportional to a two-dimensional pixel position associated with the video unit and weighted by the total number of pixel samples in one of the dimensions, and wherein the first weighting factor is determined from the second weighting factor.

40. The apparatus of claim 39, wherein the intra prediction value is determined based on a planar intra prediction mode.

41. The apparatus of claim 39, wherein the at least one additional video unit in the enhancement layer is a horizontal neighboring video unit or a vertical neighboring video unit of the video unit positioned at the position within the enhancement layer.

* * * * *